United States Patent
Zhu et al.

(10) Patent No.: US 12,399,308 B2
(45) Date of Patent: Aug. 26, 2025

(54) DISPLAY APPARATUS COMPRISING DIFFRACTIVE ELEMENTS

(71) Applicant: SHENZHEN OPTIARK SEMICONDUCTOR TECHNOLOGIES LIMITED, Guangdong (CN)

(72) Inventors: Yisheng Zhu, Guangdong (CN); Tapani Kalervo Levola, Guangdong (CN); Houqiang Jiang, Guangdong (CN)

(73) Assignee: SHENZHEN OPTIARK SEMICONDUCTOR TECHNOLOGIES LIMITED, Shenzhen (CN)

( * ) Notice: Subject to any disclaimer, the term of this patent is extended or adjusted under 35 U.S.C. 154(b) by 616 days.

(21) Appl. No.: 17/893,211

(22) Filed: Aug. 23, 2022

(65) Prior Publication Data
US 2024/0045121 A1   Feb. 8, 2024

(30) Foreign Application Priority Data

Jul. 26, 2022   (CN) .......................... 202210881911.4

(51) Int. Cl.
*G02B 5/18*     (2006.01)
*F21V 8/00*     (2006.01)
*G02B 27/00*    (2006.01)

(52) U.S. Cl.
CPC ......... *G02B 5/1814* (2013.01); *G02B 5/1842* (2013.01); *G02B 6/0016* (2013.01); *G02B 27/0081* (2013.01)

(58) Field of Classification Search
CPC .............. G02B 5/1814; G02B 5/1842; G02B 6/0016; G02B 27/0081; G02B 2027/0116;
(Continued)

(56) References Cited

U.S. PATENT DOCUMENTS

| 8,531,769 B2 * | 9/2013 | Watanabe ................ G02B 5/04 |
| | | 398/87 |
| 10,948,714 B2 * | 3/2021 | Ayres ...................... G02B 5/18 |

(Continued)

FOREIGN PATENT DOCUMENTS

| CN | 110679147 A | 1/2020 |
| CN | 101688977 A | 3/2021 |

(Continued)

OTHER PUBLICATIONS

International Search Report for PCT/CN2023/106371 Mailed on Sep. 30, 2023.
(Continued)

*Primary Examiner* — Collin X Beatty

(57) ABSTRACT

A display apparatus comprises an optical engine, a modifying unit, and a diffractive waveguiding expander device. The optical engine is configured to form first input light, which comprises a plurality of input light beams representing an input image. The modifying unit is configured to form second input light from the first input light. The diffractive waveguiding expander device is configured to form output light by diffractively expanding the second input light, where the output light comprises a plurality of output light beams representing said input image. The modifying unit contain at least one prism, which compensates the angular dispersion between the plurality of output light beams caused by the possibly exists imperfection of the waveguiding expander device.

12 Claims, 19 Drawing Sheets

(58) Field of Classification Search
CPC ........ G02B 2027/0174; G02B 27/0172; G02B 27/4205; G02B 27/0944
See application file for complete search history.

(56) References Cited

U.S. PATENT DOCUMENTS

| | | |
|---|---|---|
| 2001/0033440 A1 | 10/2001 | Togino |
| 2018/0143426 A1 | 5/2018 | Ayres et al. |
| 2019/0339447 A1 | 11/2019 | Shipton et al. |
| 2020/0117003 A1* | 4/2020 | Pfeiffer ................ G02B 6/4204 |

FOREIGN PATENT DOCUMENTS

| | | |
|---|---|---|
| CN | 212647158 U | 3/2021 |
| CN | 112817153 A | 5/2021 |
| CN | 113424085 A | 9/2021 |
| CN | 113721362 A | 11/2021 |
| CN | 114217436 A | 3/2022 |
| CN | 115079427 A | 9/2022 |
| WO | 2018125574 A1 | 7/2018 |
| WO | 2022151920 A1 | 7/2022 |

OTHER PUBLICATIONS

Notification To Grant for CN202210881911.4 Mailed on May 2, 2023.

\* cited by examiner

DISPLAY APPARATUS COMPRISING DIFFRACTIVE ELEMENTS

CROSS REFERENCE OF RELATED APPLICATION

This application claims the priority of Chinese Patent Application No. 202210881911.4, entitled "DISPLAY APPARATUS COMPRISING DIFFRACTIVE ELEMENTS", filed on Jul. 26, 2022, the disclosure of which is incorporated herein by reference in its entirety.

FIELD

The present invention relates to a display apparatus, which comprises a diffractive beam expander.

BACKGROUND

A known virtual display device comprises an optical engine and a diffractive beam expander. The optical engine forms input light beams, which correspond to a primary image displayed on a miniature display. The directions and the intensities of the input light beams correspond to the positions and the brightness values of the different points of primary image. The diffractive beam expander forms expanded light beams from the input light beams by using diffractive elements. The user may observe the displayed virtual image when the expanded light beams impinge on his eye.

The magnitude of a grating vector depends on the grating period of a diffraction grating of a diffractive element, and the direction of the grating vector depends on the orientation of the diffraction grating. The diffractive beam expander comprises several diffractive elements in the optical path. The diffractive beam expander is typically designed such that the sum of grating vectors of the diffractive elements in the optical path is equal to zero. The diffractive beam expander may receive input light beams through a first major surface of the expander. Known diffractive expander devices are typically designed to operate such that the sum of grating vectors of the diffractive elements belonging to the optical path is equal to zero, so as to ensure that each output light beam provided through the second major surface of the diffractive beam expander is parallel with the corresponding input light beam obtained from the optical engine.

However, the grating period and/or orientation of a diffractive element may sometimes be incorrect so that the displayed virtual image becomes deformed. The deformation may sometimes be so severe that a manufactured diffractive beam expander needs to be rejected.

SUMMARY

An object is to provide a display apparatus. An object is to provide a method for displaying a virtual image.

According to an aspect, there is provided a display apparatus, comprising: an optical engine, a modifying unit, and a diffractive waveguiding expander device. The optical engine is configured to form first input light, which comprises a plurality of input light beams representing an input image. The modifying unit is configured to form second input light from the first input light. The diffractive waveguiding expander device is configured to form output light by diffractively expanding the second input light. The output light comprises a plurality of output light beams representing said input image. The expander device comprises a diffractive in-coupling element and an out-coupling element contributing to the direction of light in an optical path. Each of the diffractive in-coupling element and the out-coupling element has one or more grating vectors contributing to the direction of light in the optical path. The diffractive in-coupling element of the optical path has a first grating vector. A magnitude ratio of the magnitude of a sum of the grating vectors to the magnitude of the absolute value of the first grating vector is in the range of 0.01% to 1%. A first angular deflection is an angular difference between a direction of a first input light beam having a first color, and a direction of a first output light beam formed from light of the first input light beam, wherein a second angular deflection is an angular difference between a direction of a second input light beam having a second color, and a direction of a second output light beam formed from light of the second input light beam. The modifying unit comprises at least a first prism to reduce the difference between the first angular deflection and the second angular deflection.

The scope of protection sought for various embodiments of the invention is set out by the independent claims. The embodiments, if any, described in this specification that do not fall under the scope of the independent claims are to be interpreted as examples useful for understanding various embodiments of the invention.

The display apparatus comprises an optical engine to form first input light, which represents an input image, a modifying unit to form second input light from the first input light, and an expander device to form output light by diffractively expanding the second input light. The output light comprises a plurality of output light beams corresponding to the image points of the input image. The user may observe a displayed virtual image when the output light impinges on his eye. The display apparatus has an eye box, which refers to the space where the eye can be positioned to view the displayed virtual image.

The display apparatus may be arranged to display a multi-color image. The multi color image may be e.g. an RGB image, which comprises red (R) image pixels, green (G) image pixels, and blue (B) image pixels. The display apparatus may be arranged to operate such that output light beams of different colors are mutually parallel with each other, in a situation where the output light beams of the different colors are formed from light of the same multi-color image point of the displayed image.

The diffractive waveguiding expander device of the display apparatus comprises a waveguide plate, which in turn comprises several diffractive elements, which contribute to the direction of light in an optical path.

In case of the present display apparatus, the sum of the grating vectors of the diffractive elements belonging to the optical path inside the expander device deviate from zero e.g. intentionally and/or due to manufacturing tolerances. For example, a diffractive in-coupling element and a diffractive out-coupling element of the expander device may be formed by embossing with one or more embossing tools, wherein an error in the orientation of the embossing tool may give rise to a non-zero sum of the grating vectors.

The non-zero sum of the grating vectors may cause wavelength-dependent deformation of the displayed virtual image. In a comparative example, the non-zero sum can cause e.g. that a single multi-color point of the input image is divided into separate red, green and blue elongated spots in the displayed virtual image. In a comparative example, the non-zero sum of the grating vectors may cause chromatic aberration of the displayed virtual image.

The dispersing effect the expander device may be proportional to the magnitude ratio E1 of the magnitude of the sum $\Sigma_i V_i$ of grating vectors $V_i$ to the magnitude of the grating vector $V_1$ of the in-coupling grating. The symbol i denotes an index of a grating vector $V_i$. The sum refers to the vector sum, i.e. the sum of the grating vectors takes into account the directions and the magnitudes of the grating vectors. The magnitude ratio E1 may be e.g. in the range of 0.01% to 1%. For example, the expander device may comprise an in-coupling element, an expander element, and an out-coupling element, and the sum $V_1+V_2+V_3$ of the grating vectors to the magnitude of the grating vector $V_1$ of the in-coupling grating may be e.g. in the range of 0.01% to 1%. The dispersion caused by the non-zero sum of the grating vectors may have a significant effect on the image quality e.g. when the magnitude ratio E1 is greater than or equal to 0.1%. The magnitude ratio E1 may be e.g. in the range of 0.1% to 1%.

The modifying unit of the display apparatus comprises one or more spectrally dispersing prisms positioned one after the other. The materials and the angles of the one or more prisms may be selected so as to compensate dispersion caused by the diffractive expander device e.g. when the magnitude ratio E1 is in the range of 0.01% to 1%.

The modifying unit may compensate wavelength-dependent deformation of the displayed virtual image. The modifying unit may operate as an error correcting unit.

Using a single prism may allow compensating wavelength-dependent deformation of the displayed image at the wavelength of a first color and at the wavelength of a second color.

Using two prisms may allow compensating wavelength-dependent deformation of the displayed image at the wavelength of a first color, at the wavelength of a second color, and at the wavelength of a third color.

In an embodiment implemented by a single prism, the material (MAT1), orientation ($\phi_{a1}$), and wedge angle ($\gamma 1$) of the prism (PRISM1) may be selected so that an angular difference ($\Delta\theta$) between the direction ($\theta_{B3,P0,R}$) of a red output light beam ($B3_{P0,R}$) and the direction of a blue output light beam ($B3_{P0,B}$) is smaller than 0.01 degrees, in a situation where the red output light beam ($B3_{P0,R}$) and the blue output light beam ($B3_{P0,B}$) represent the same multi-color point (P0) of the input image (IMG0).

In an embodiment implemented by two or more prisms, the materials (MAT1, MAT2), orientations ($\phi_{a1}$, $\phi_{a2}$), and wedge angles ($\gamma 1$, $\gamma 2$) of the prisms (PRISM1, PRISM2) may be selected so that an angular difference ($\Delta\theta$) between the direction ($\theta_{B3,P0,R}$) of a red output light beam ($B3_{P0,R}$) and the direction of a blue output light beam ($B3_{P0,B}$) is smaller than 0.01 degrees, and so that an angular difference ($\Delta\theta$) between the direction ($\theta_{B3,P0,R}$) of the red output light beam ($B3_{P0,R}$) and the direction of a green output light beam ($B3_{P0,G}$) is smaller than 0.01 degrees, in a situation where the red output light beam ($B3_{P0,R}$), the blue output light beam ($B3_{P0,B}$), and the green output light beam ($B3_{P0,G}$) represent the same multi-color point (P0) of the input image (IMG0).

In an embodiment, the diffractive elements of the expander device may be intentionally implemented such that the ratio (E1) of the magnitude of the sum $\Sigma_i V_i$ of grating vectors $V_1$ to the magnitude of the grating vector $V_1$ of the in-coupling grating may be e.g. in the range of 0.01% to 1%. The non-zero sum may e.g. reduce disturbing interference effects caused by the expander element on mutually parallel major surfaces (SRF1, SRF2) of the waveguide plate.

A single color of the displayed multi-color image may be formed by using light, which has a significant spectral bandwidth, e.g. greater than 10 nm. The single color may be obtained e.g. by using light emitted from one or more light emitting diodes. The optical engine may comprise one or more light emitting diodes for forming the input image. For example, the spectral bandwidth of green light obtained from a light emitting diode may be greater than 10 nm.

Different spectral positions of the spectral intensity distribution of a green image point may be mapped into different angular directions of the output light, due to the non-zero sum of the grating vectors. The non-zero sum of the grating vectors may cause dispersion-induced elongation of a displayed green image point. The displayed virtual image may comprise green elongated spots instead of sharp green image points.

Using one or more prisms may allow compensating dispersion-induced elongation of displayed image points. The one or more prisms may reduce the width of a displayed elongated spot, e.g. in a situation where said elongated spot represents a green point of the input image, and the spectral bandwidth of the green light is e.g. greater than 10 nm.

The apparatus may optionally utilize image shifting for compensating wavelength-dependent deformation of the displayed virtual image. The input image may be a multi-color image, which comprises a red sub-image, a green sub-image, and a blue sub-image. The displayed virtual image may be a multi-color image, which comprises a red sub-image, a green sub-image, and a blue sub-image. The optical engine may be arranged to display the input image such that the green sub-image of the input image is displaced with respect to the red sub image of the input image. The displacement may be selected such that the green sub-image of the displayed virtual image substantially coincides with the red sub-image of the displayed virtual image.

The optical engine may optionally have a tilted orientation with respect to the expander device. The optical engine may optionally have a tilted orientation e.g. in order to compensate a (global) beam-deflecting effect of the modifying unit. For example, the optical engine may be tilted such that output light beams representing the center of the input image may have a desired orientation with respect to the waveguide plate of the expander element. For example, the optical engine may be tilted such that output light beams representing the center of the input image may be perpendicular or substantially perpendicular to the waveguide plate of the expander element.

BRIEF DESCRIPTION OF THE DRAWINGS

In the following examples, several variations will be described in more detail with reference to the appended drawings.

FIG. 13b shows, by way of example, in a three-dimensional view, a display apparatus, which comprises the diffractive expander device of FIG. 13a.

FIG. 14b shows, by way of example, in a three-dimensional view, a display apparatus, which comprises the expander device of FIG. 14a.

DETAILED DESCRIPTION

Figure 1A:
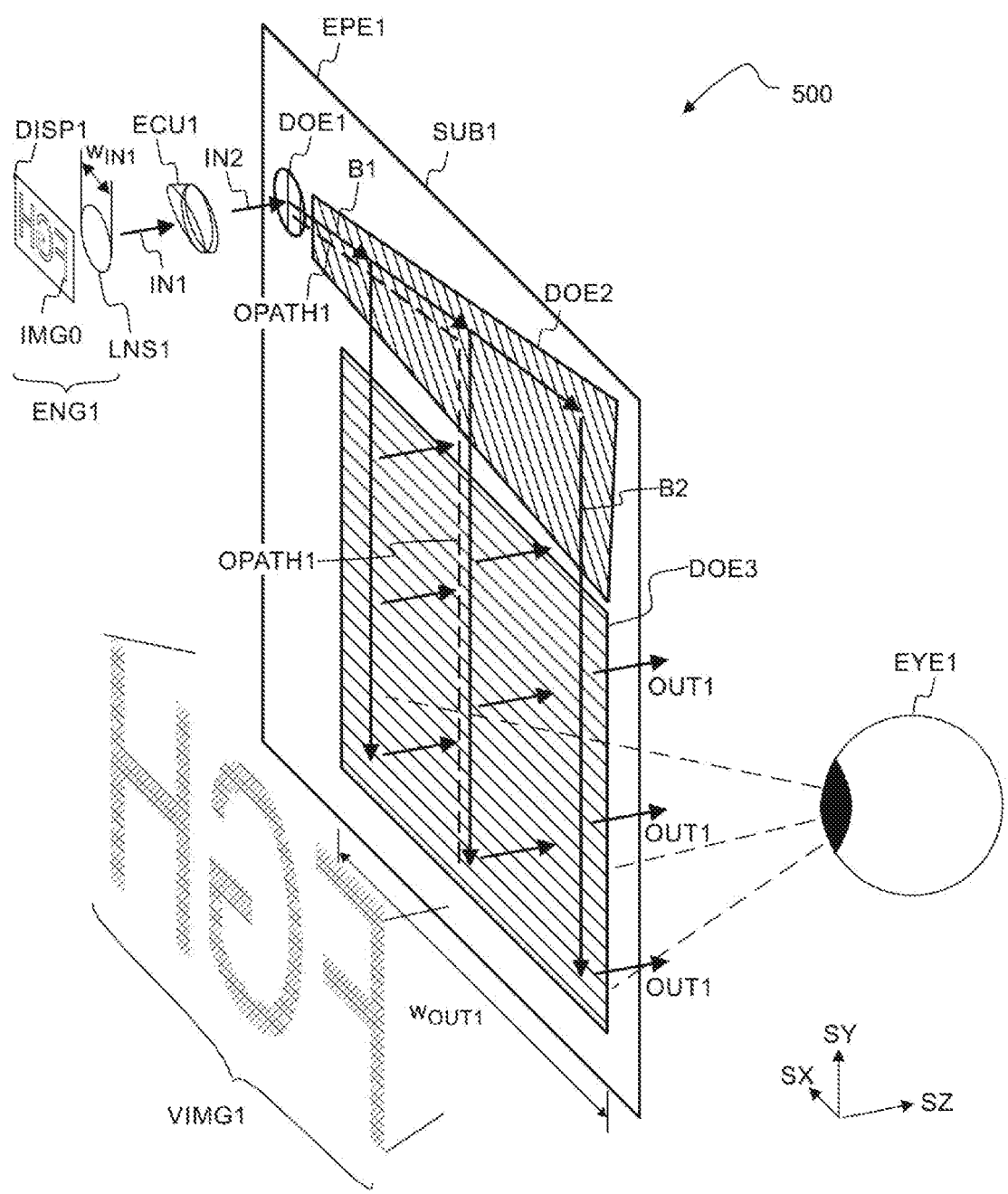
FIG. 1a shows, by way of example, in a three-dimensional view, a display apparatus, which comprises a diffractive expander device.

Referring to FIG. 1a, the display apparatus 500 may comprise an optical engine ENG1 to form first input light IN1, a modifying unit ECU1 to form second input light IN2 from the first input light IN1, and a diffractive waveguiding expander device EPE1 to form expanded output light OUT1 from the second input light IN2.

An observer may see the displayed virtual image VIMG1 when the output light OUT1 impinges on the eye EYE1 of the observer.

The first input light IN1 may comprise a plurality of input light beams ($B0_{P0,R}$, $B0_{P0,G}$, $B0_{P0,B}$) representing an input image IMG0. The optical engine ENG1 may comprise a display element DISP1 for displaying the input image IMG0. The input image IMG0 may comprise a plurality of image points arranged in a two-dimensional array. The optical engine ENG1 may comprise collimating optics LNS1 to form a plurality of input light beams ($B0_{P0,R}$, $B0_{P0,G}$, $B0_{P0,B}$) from the image points of the input image IMG0.

The modifying unit ECU1 may form the second input light IN2 by refracting the first input light IN1. The second input light IN2 may also be called e.g. as refracted light or as deflected light.

The diffractive waveguiding expander device EPE1 may form output light OUT1 by diffractively expanding the second input light IN2. The output light OUT1 may comprise a plurality of output light beams ($B3_{P0,R}$, $B3_{P0,G}$, $B3_{P0,G}$) representing said input image IMG0.

The expander device EPE1 may diffractively expand light. The width $w_{OUT1}$ of the output light beams may be greater than the width $w_{IN1}$ of the input light beams.

The expander device EPE1 comprises a waveguide plate SUB1, which in turn comprises diffractive elements DOE1, DOE2, DOE3. The expander device EPE1 may comprise an in-coupling element DOE1 for diffractively coupling the second input light IN2 into the waveguide plate SUB1. The expander device EPE1 may comprise an out-coupling element DOE3 for diffractively coupling the output light OUT1 out of the waveguide plate SUB1.

For example, the diffractive waveguide expander device EPE1 may comprise a waveguide plate SUB1, which in turn comprises:
- a diffractive in-coupling element DOE1 to form first guided light B1 by diffracting the second input light IN2 into the waveguide plate SUB1,
- an expander element DOE2 to form second guided light B2 by diffracting the first guided light B1, and
- the out-coupling element DOE3 to form output light OUT1 by diffracting the second guided light B2 out of the waveguide plate SUB1.

The expander device EPE1 may comprise diffractive elements DOE1, DOE2, DOE3 contributing to the direction of light in an optical path OPATH1. Each diffractive element has one or more grating vectors ($V_1$, $V_2$, $V_3$) contributing to the direction of light in the optical path OPATH1. The in-coupling element has a first grating vector ($V_1$). The expander device may have a mismatch between the diffractive elements of the optical path OPATH1 so that a magnitude ratio (E1) of the magnitude of a sum ($\Sigma V_1$) of the grating vectors ($V_1$, $V_2$, $V_3$) to the magnitude of the first grating vector ($V_1$) is in the range of 0.01% to 1%.

The mismatch between the diffractive elements may be caused intentionally and/or due to manufacturing tolerances. For example, the mismatch may reduce disturbing interference effects caused by the waveguiding plate. For example, said mismatch may be associated with wider manufacturing tolerances, which in turn may allow reducing manufacturing costs.

SX, SY, and SZ denote orthogonal directions. The major surfaces of the waveguide plate SUB1 may be parallel with the plane defined by the directions SX and SY. The direction SZ may be perpendicular to the major surfaces of the waveguide plate SUB1. The direction SZ may be perpendicular to the in-coupling element DOE1.

Figure 1B:
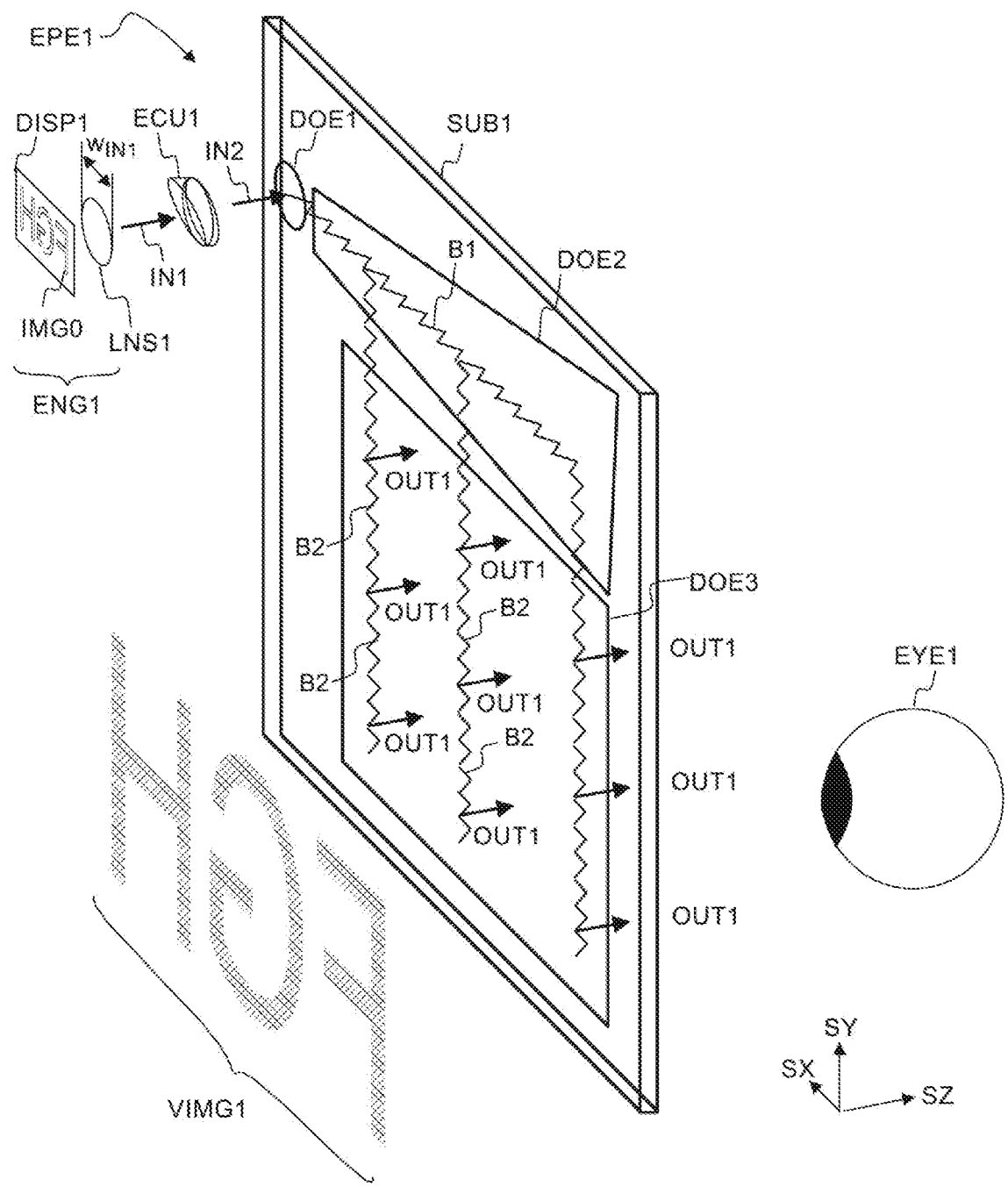
FIG. 1b shows, by way of example, in a three-dimensional view, propagation of guided light within the waveguide plate of the expander device.

FIG. 1b shows, by way of example, forming second input light IN2 by refracting first input light IN1, forming first guided light B1 by diffractively coupling the second input light IN2 into the waveguide substrate SUB1, propagation of the first guided light B1 in the waveguide plate SUB1, forming second guided light by diffracting the first guided light B1, and forming output light OUT1 by diffractively coupling the second guided light B2 out of the waveguide plate SUB1.

Figure 2:
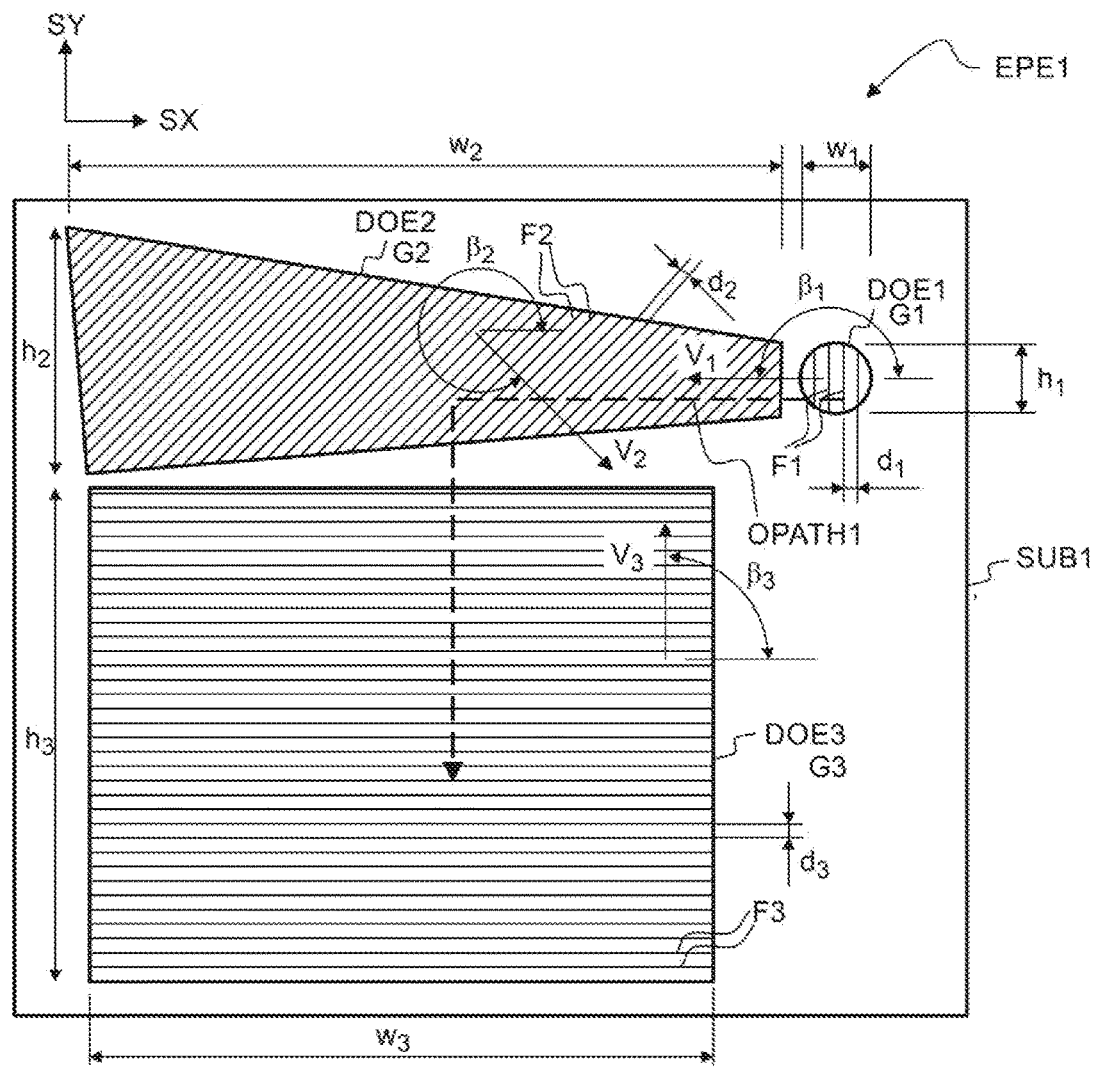
FIG. 2 shows, by way of example, in an axial view, dimensions of the expander device.

FIG. 2 shows, by way of example, dimensions and grating vectors of the diffractive elements of the expander device EPE1. The expander device EPE1 may comprise elements DOE1, DOE2, DOE3, which belong to the optical path OPATH1. Each element DOE1, DOE2, DOE3 has a diffraction grating G1, G2, G3. The in-coupling element DOE1 may have a width $w_1$, height $h_1$, grating period $d_1$, and a grating vector $V_1$. The expander element DOE2 may have a width $w_2$, height $h_2$, grating period $d_2$, and a grating vector $V_2$. The out-coupling element DOE3 may have a width $w_3$, height $h_3$, grating period $d_3$, and a grating vector $V_3$.

The grating G1 has diffractive features F1. The grating G2 has diffractive features F2. The grating G3 has diffractive features F3. The grating period (d) of a diffraction grating and the orientation (β) of the diffractive features (F) of the diffraction grating (G) may specify a grating vector (V) of said diffraction grating. The diffraction grating comprises a plurality of diffractive features (F1, F2, F3) which may operate as diffractive lines. The diffractive features may be e.g. microscopic ridges or grooves. The diffractive features may be e.g. microscopic protrusions (or recesses), wherein adjacent rows of protrusions (or recesses) may operate as diffractive lines. The grating vector (V) may be defined as a vector having a direction perpendicular to diffractive lines of the diffraction grating and a magnitude given by 2π/d, where d is the grating period. The grating period means the same as the grating period length. The grating period may be the length between consecutive diffractive features of the grating. The grating period may be equal to a unit length divided by the number of diffractive features located within said unit length. The grating period $d_1$ of the in-coupling element DOE1 may be e.g. in the range of 330 nm to 450 nm. The optimum value of a grating period $d_1$ may depend e.g. on the refractive index of the plate SUB1 and on the peak wavelengths ($\lambda_R$, $\lambda_G$, $\lambda_B$) of the different colors (R, G, B).

The magnitude of a grating vector ($V_1$, $V_2$, $V_3$) of a diffractive element is equal to 2π/d, where d denotes a grating period ($d_1$, $d_2$, $d_3$) of said diffractive element. The orientations of the grating vectors $V_1$, $V_2$, $V_3$ may be specified e.g. by orientation angles $\beta_1$, $\beta_2$, $\beta_3$. The direction (β) of a grating vector may be specified e.g. by the angle between said vector and a reference direction (e.g. direction SX). The first grating vector $V_1$ has a direction $\beta_1$ and a magnitude $2\pi/d_1$. The grating vector $V_2$ of the expander element DOE2 has a direction $\beta_2$ and a magnitude $2\pi/d_2$. The grating vector $V_3$ of the out-coupling element has a direction $\beta_3$ and a magnitude $2\pi/d_3$.

Figure 3A:
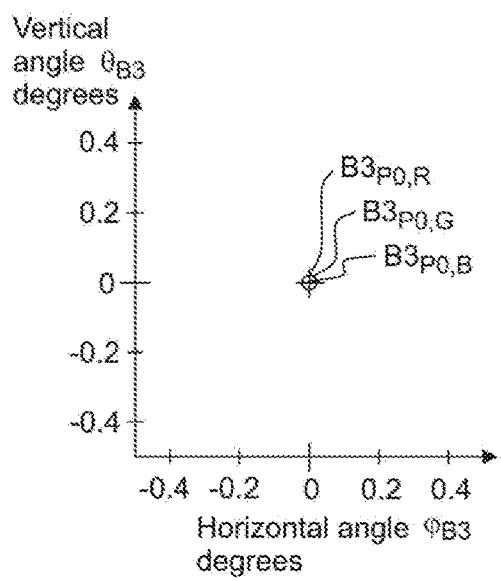
FIG. 3a shows, by way of example, mutually parallel directions of output light beams, which represent different colors of the same multi-color point of the input image.

Referring to FIG. 3a, the display apparatus 500 may be arranged to form mutually parallel output light beams $B3_{P0,R}$, $B3_{P0,B}$, $B3_{P0,G}$, which correspond to the same multi-color point P0 of the input image IMG0. A first output light beam $B3_{P0,R}$ has a first color, e.g. red (R). A second output light beam $B3_{P0,B}$ has a second color, e.g. blue (B). A third output light beam $B3_{P0,G}$ has a third color, e.g. green (G).

The direction of each output light beam may be specified e.g. by direction angles $\theta_{B3}$, $\varphi_{B3}$. The angle $\theta_{B3}$ may denote a vertical angle between the direction of an output light beam and the direction SZ. The angle $\varphi_{B3}$ may denote a horizontal angle between the direction of an output light beam and the direction SZ.

Figure 3B:
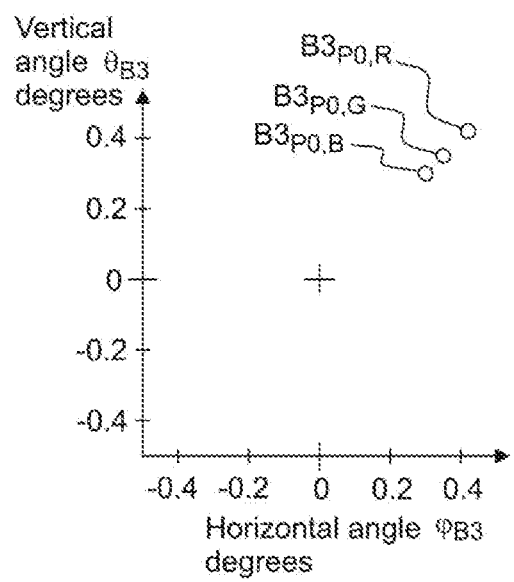
FIG. 3b shows, by way of example, directions of output light beams, which represent different colors of the same multi-color point of the input image, in a situation where a grating period and/or orientation of a diffraction grating of the expander device is erroneous.
Figure 3C:
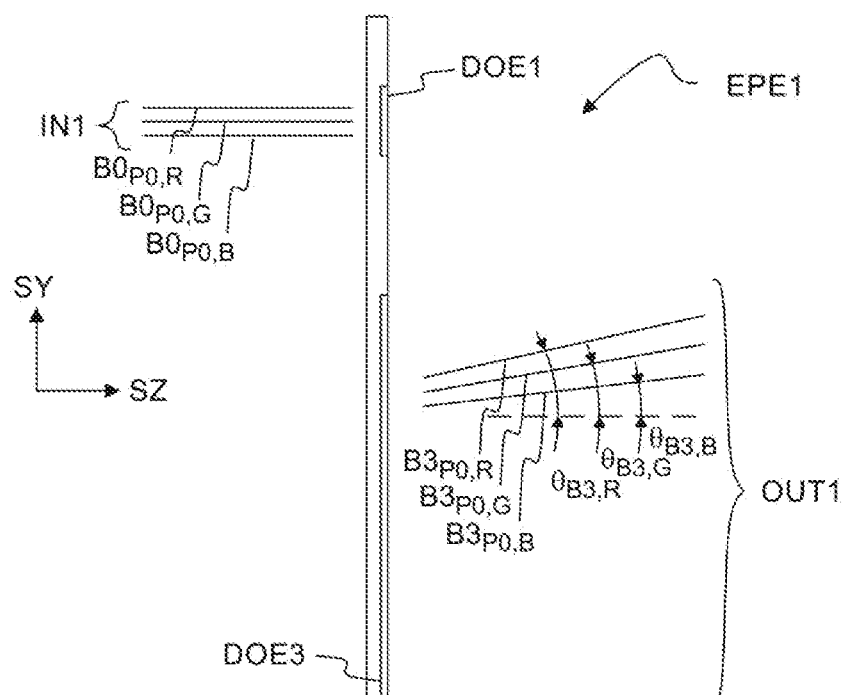
FIG. 3c shows, by way of example, directions of output light beams, which represent different colors of the center point of the input image, in a situation where a grating period and/or orientation of a diffraction grating of the expander device is erroneous.

FIGS. 3b and 3c show a comparative example where the non-zero sum of the grating vectors causes angular dispersion of the output light beams $B0_{P0,R}$, $B0_{P0,B}$, $B0_{P0,G}$, which correspond to the same multi-color point P0. Input light IN1 may comprise parallel input light beams $B0_{P0,R}$, $B0_{P0,B}$, $B0_{P0,G}$. In this comparative example, the expander device EPE1 may diffractively expand the light of the input light beams $B0_{P0,R}$, $B0_{P0,B}$, $B0_{P0,G}$ so that the output light beams $B3_{P0,R}$, $B3_{P0,B}$, $B3_{P0,G}$ of the different colors propagate to different directions $\theta_{B3,R}$, $\theta_{B3,B}$, $\theta_{B3,G}$. Consequently, the multi-color image point of the input image is deformed into a group of separate single-color image points of the displayed virtual image.

Figure 3D:
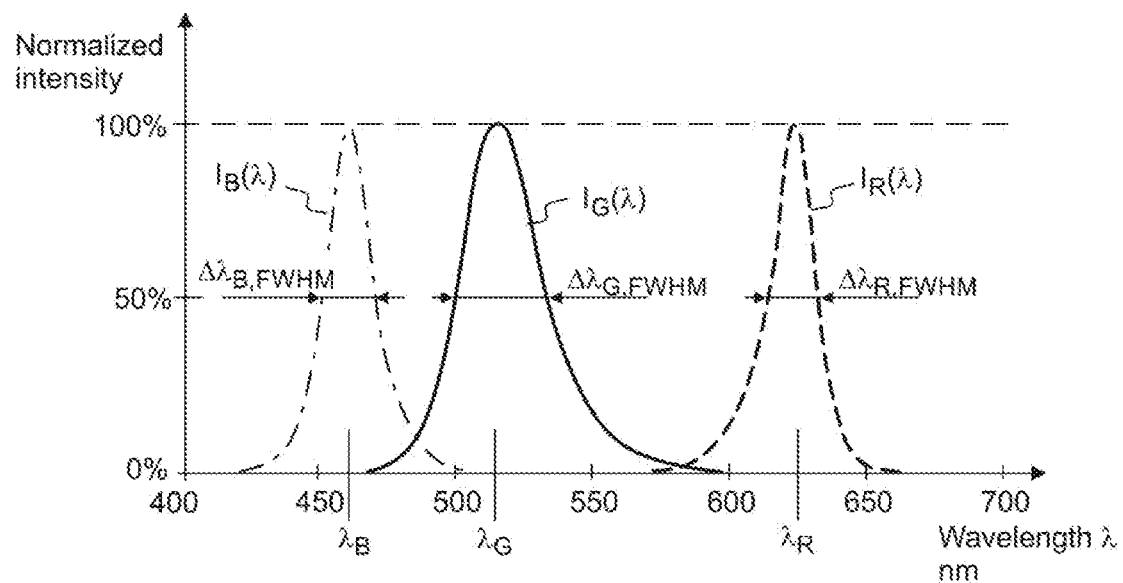
FIG. 3d shows, by way of example, spectral intensity distributions of red light, green light, and blue light.

FIG. 3d shows by way of example normalized spectral intensity distributions $I_R(\lambda)$, $I_B(\lambda)$, $I_G(\lambda)$ of the input light beams $B0_{P0,R}$, $B0_{P0,B}$, $B0_{P0,G}$. The light of the input light beams $B0_{P0,R}$, $B0_{P0,B}$, $B0_{P0,G}$ may be emitted e.g. from light emitting diodes.

The distribution $I_R(\lambda)$ may have a peak at a wavelength $\lambda_R$. The distribution $I_B(\lambda)$ may have a peak at a wavelength $\lambda_B$. The distribution $I_G(\lambda)$ may have a peak at a wavelength $\lambda_G$. The spectral separation between the peak wavelengths $\lambda_R$, $\lambda_G$, $\lambda_B$ of the different colors may be e.g. greater than 50 nm.

The peak wavelength $\lambda_R$ may be e.g. in the range of 620 nm to 700 nm, advantageously in the range of 620 nm to 650 nm. The peak wavelength $\lambda_G$ may be e.g. in the range of 490 to 580 nm, advantageously in the range of 500 nm to 550 nm. The peak wavelength $\lambda_B$ may be e.g. in the range of 450 to 490 nm, advantageously in the range of 450 nm to 470 nm.

The distribution $I_R(\lambda)$ may have a FWHM spectral width $\Delta\lambda_{R,FWHM}$. The distribution $I_B(\lambda)$ may have a FWHM spectral width $\Delta\lambda_{B,FWHM}$. The distribution $I_G(\lambda)$ may have a FWHM spectral width $\Delta\lambda_{G,FWHM}$. FWHM denotes full width at half maximum. The FWHM spectral width $\Delta\lambda_{G,FWHM}$ of green light emitted from a light emitting diode may be e.g. in the range of 10 nm to 50 nm.

Each output light beam may have the same normalized spectral intensity distribution as the corresponding input light beam, but the maximum spectral intensity of each output light beam is lower than the maximum spectral intensity of the corresponding input light beam. A distribution may be normalized by dividing each value of said distribution by the maximum value of said distribution.

The normalized spectral intensity distribution $I_R(\lambda)$ of an output light beam $B3_{P0,R}$ formed from light of the input light beam $B0_{P0,R}$ may be the same as the normalized spectral intensity distribution $I_R(\lambda)$ of said input light beam $B0_{P0,R}$.

The normalized spectral intensity distribution $I_B(\lambda)$ of an output light beam $B3_{P0,B}$ formed from light of the input light beam $B0_{P0,B}$ may be the same as the normalized spectral intensity distribution $I_B(\lambda)$ of said input light beam $B0_{P0,B}$.

The normalized spectral intensity distribution $I_G(\lambda)$ of an output light beam $B3_{P0,G}$ formed from light of the input light beam $B0_{P0,G}$ may be the same as the normalized spectral intensity distribution $I_G(\lambda)$ of said input light beam $B0_{P0,G}$.

Figure 3E:
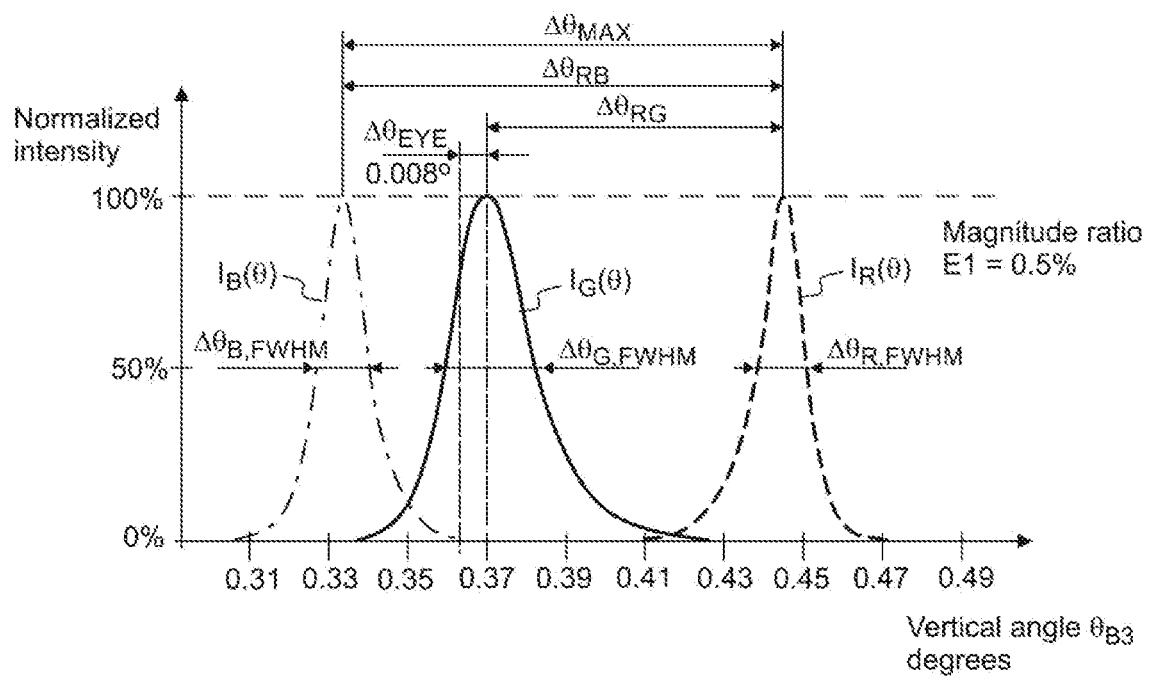
FIG. 3e shows, by way of example, angular intensity distribution of a red output light beam, angular intensity distribution of a green output light beam, and angular intensity distribution of a blue output light beam, in a situation where a grating period and/or orientation of a diffraction grating of the expander device is erroneous.

FIG. 3e shows, as a comparative example, angular dispersion caused by the non-zero sum of the grating vectors of the expander device EPE1. In this example the magnitude ratio E1 is 0.5%. The expander device EPE1 disperses different spectral components of the output light beams to different directions, in a situation where the output light beams correspond to the same point P0 of the input image IMG0. $I_R(\theta)$ denotes angular intensity distribution of a first output light beam $B3_{P0,R}$. $I_B(\theta)$ denotes angular intensity distribution of a second output light beam $B3_{P0,B}$. $I_G(\theta)$ denotes angular intensity distribution of a third output light beam $B3_{P0,G}$. The first output light beam $B3_{P0,R}$ has an angular divergence $\Delta\theta_{R,FWHM}$. The second output light beam $B3_{P0,B}$ has an angular divergence $\Delta\theta_{B,FWHM}$. The third output light beam $B3_{P0,G}$ has an angular divergence $\Delta\theta_{G,FWHM}$. Different spectral positions of the spectral intensity distribution of a single green image point are mapped into different angular directions of the output light, due to the non-zero sum of the grating vectors. The non-zero sum of the grating vectors causes dispersion-induced elongation of the displayed green image point. The displayed virtual image comprises a green elongated spot instead of a sharp green image point. In this comparative example, the divergences $\Delta\theta_{R,FWHM}$, $\Delta\theta_{B,FWHM}$, $\Delta\theta_{G,FWHM}$ are so large that the output light beams appear as elongated blurred spots when the output light beams impinge on the eye EYE1 of the observer.

$\Delta\theta_{RB}$ denotes angular difference between the direction of a red output light beam and a blue output light beam. In this example $\Delta\theta_{RB}$ is 0.11°. $\Delta\theta_{RG}$ denotes angular difference between the direction of a red output light beam and a green output light beam. In this example $\Delta\theta_{RG}$ is 0.075°. $\Delta\theta_{MAX}$ denotes the largest angular difference between directions of single-color output light beams, which correspond to the same multi-color point of the input image. In this example $\Delta\theta_{MAX}$ is 0.11°.

$\Delta\theta_{EYE}$ denotes the angular resolution of an eye EYE1. For detecting individual points, the angular resolution of an eye EYE1 may be e.g. 0.008° (=half arc minute). For detecting a displacement between linear features, the angular resolution $\Delta\theta_{EYE}$ of the eye EYE1 may be even better, e.g. 0.002°.

In the comparative example of FIG. 3e, the largest angular difference $\Delta\theta_{MAX}$ is 0.11°, which is greater than the angular resolution $\Delta\theta_{EYE}$ of the eye EYE1. The output beams of the different colors appear as separate spots to the eye EYE1 of an observer.

In the comparative example of FIG. 3e, the angular divergence $\Delta\theta_{G,FWHM}$ of the green output light beam is 0.023°, which is greater than the angular resolution $\Delta\theta_{EYE}$ of the eye EYE1. The green output light beam appears as an elongated spot to the eye EYE1 of an observer.

In an additional comparative example, the magnitude ratio E1 of the expander device is 0.1%, and the largest angular difference $\Delta\theta_{MAX}$ formed by the expander device is 0.02° without using the modifier unit. This angular difference $\Delta\theta_{MAX}$ may be easily detectable by an eye EYE1.

In an additional comparative example, the magnitude ratio E1 of the expander device is 0.01%, and the largest angular difference $\Delta\theta_{MAX}$ formed by the expander device is 0.002° without using the modifier unit. This angular difference $\Delta\theta_{MAX}$ might still be visually detectable when observing linear features.

Figure 4A:
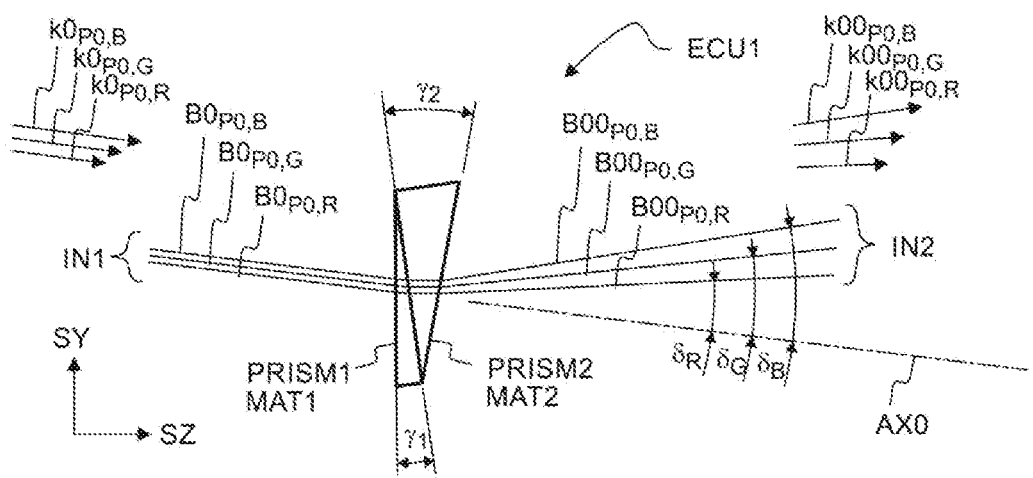
FIG. 4a shows, by way of example, in a side view, a modifying unit.

Referring to FIG. 4a, the display apparatus 500 comprises a modifying unit ECU1 to compensate angular dispersion of the expander device EPE1. The modifying unit ECU1 may be used to compensate the dispersion e.g. when the magnitude ratio E1 is in the range of 0.01% to 1%. In particular, the modifying unit ECU1 may be used to compensate the dispersion e.g. when the magnitude ratio E1 is in the range of 0.1% to 1%.

The modifying unit ECU1 comprises one or more refractive prisms PRISM1, PRISM2 to form second input light IN2 from the first input light IN1. A first prism PRISM1 of the modifying unit ECU1 may comprise or consist of a first material MAT1 which has first dispersive properties. A second prism PRISM2 of the modifying unit ECU1 may comprise or consist of a second material MAT2 which has second different dispersive properties. The first prism PRISM1 may have a wedge angle $\gamma_1$. The second prism PRISM2 may have a wedge angle $\gamma_2$.

The modifying unit ECU1 may form second input light IN2 from first input light IN1. The second input light IN2 may comprise deflected light beams $B00_{P0,R}$, $B00_{P0,B}$, $B00_{P0,G}$. The second input light IN2 may also be called e.g.

as refracted light or as deflected light. The modifying unit ECU1 may form the deflected light beams $B00_{P0,R}$, $B00_{P0,B}$, $B00_{P0,G}$ by refracting light of the input light beams $B0_{P0,R}$, $B0_{P0,B}$, $B0_{P0,G}$.

The direction of the first input light beam $B0_{P0,R}$ may be specified by the wave vector $k0_{P0,R}$ of the first input light beam $B0_{P0,R}$. The direction of the second input light beam $B0_{P0,B}$ may be specified by the wave vector $k0_{P0,B}$ of the second input light beam $B0_{P0,B}$. The direction of the third input light beam $B0_{P0,G}$ may be specified by the wave vector $k0_{P0,G}$ of the third input light beam $B0_{P0,G}$.

The directions of the deflected light beams $B00_{P0,R}$, $B00_{P0,B}$, $B00_{P0,G}$ may be specified by the wave vectors $k00_{P0,R}$, $k00_{P0,B}$, $k00_{P0,G}$ of said deflected light beams $B00_{P0,R}$, $B00_{P0,B}$, $B00_{P0,G}$.

$\delta_R$ may denote the angular difference between the direction of the first input light beam $B0_{P0,R}$ and a first deflected light beam $B00_{P0,R}$ formed from light of the first input light beam $B0_{P0,R}$.

$\delta_B$ may denote the angular difference between the direction of the second input light beam $B0_{P0,B}$ and a second deflected light beam $B00_{P0,B}$ formed from light of the second input light beam $B0_{P0,B}$.

$\delta_G$ may denote the angular difference between the direction of the third input light beam $B0_{P0,G}$ and a third deflected light beam $B00_{P0,G}$ formed from light of the third input light beam $B0_{P0,G}$.

Figure 4B:
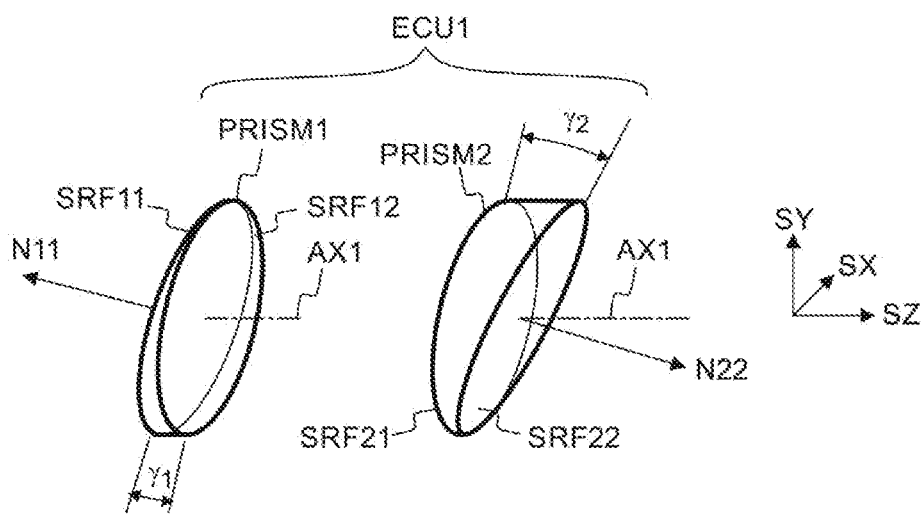
FIG. 4b shows, by way of example, in a three-dimensional view, a first prism and a second prism of the modifying unit.

Referring to FIG. 4b, the first prism PRISM1 may have a wedge angle $\gamma_1$ defined by two flat refractive surfaces SRF11, SRF12. The surface SRF11 may have a surface normal N11. The second prism PRISM2 may have a wedge angle $\gamma_2$ defined by two flat refractive surfaces SRF21, SRF22. The surface SRF22 may have a surface normal N22. AX1 may denote an optical axis of the modifying unit ECU1.

Figure 4C:
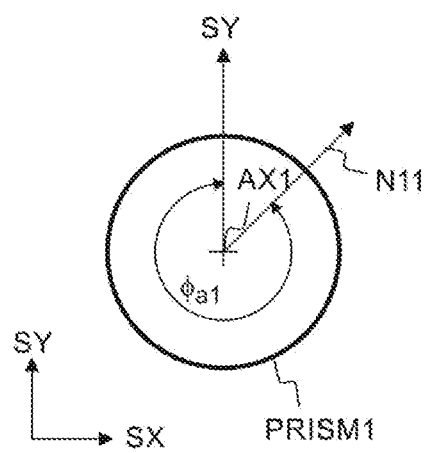
FIG. 4c shows, by way of example, in an axial view, an angular orientation of a first prism of the modifying unit.

Referring to FIG. 4c, the angular orientation of the first prism PRISM1 may be specified e.g. by an orientation angle $\phi_{a1}$. The angle $\phi_{a1}$ may e.g. specify an azimuthal direction of the surface normal N11 of the first prism PRISM1. The angle $\phi_{a1}$ may e.g. specify the azimuthal position of the thinnest part of the first prism PRISM1.

Figure 4D:
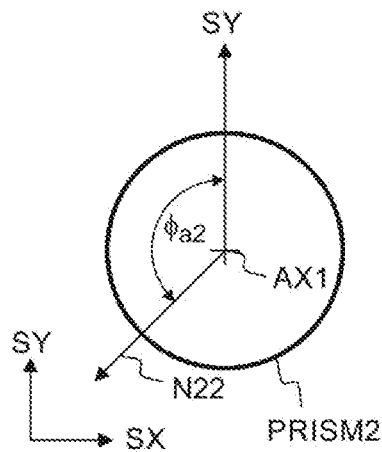
FIG. 4d shows, by way of example, in an axial view, an angular orientation of a second prism of the modifying unit.

Referring to FIG. 4d, the angular orientation of the second prism PRISM2 may be specified e.g. by an orientation angle $\phi_{a2}$. The angle $\phi_{a2}$ may e.g. specify an azimuthal direction of the surface normal N22 of the second prism PRISM2. The angle $\phi_{a2}$ may e.g. specify the azimuthal position of the thinnest part of the second prism PRISM2.

Figure 5A:
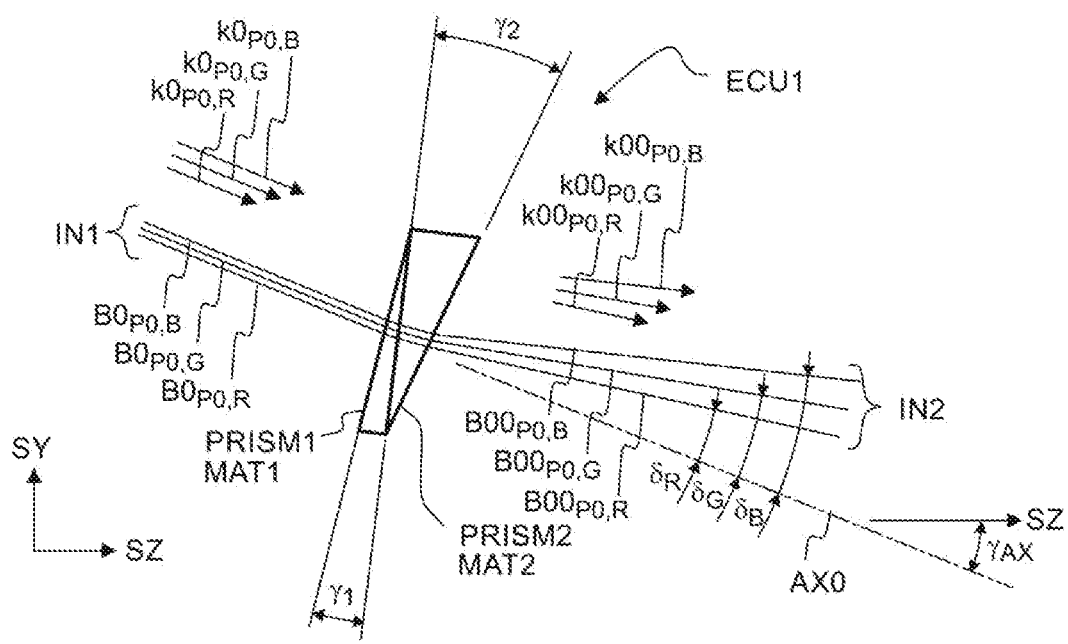
FIG. 5a shows, by way of example, in a side view, angular dispersion of the modifying unit.

Referring to FIG. 5a, the modifying unit ECU1 may form the deflected light beams $B00_{P0,R}$, $B00_{P0,B}$, $B00_{P0,G}$ by refracting light of the input light beams $B0_{P0,R}$, $B0_{P0,B}$, $B0_{P0,G}$.

$\gamma_{AX1}$ may denote an angle between the optical axis AX0 of the optical engine ENG1 and the direction SZ. The direction SZ may be parallel with the normal direction of the waveguide plate SUB1 of the expander device EPE1. The direction SZ may be parallel with the normal direction (N1) of the in-coupling element DOE1 of the expander device EPE1.

The optical axis AX0 of the optical engine ENG1 may form a predetermined angle $\gamma_{AX1}$ with respect to the direction SZ.

Figure 5B:
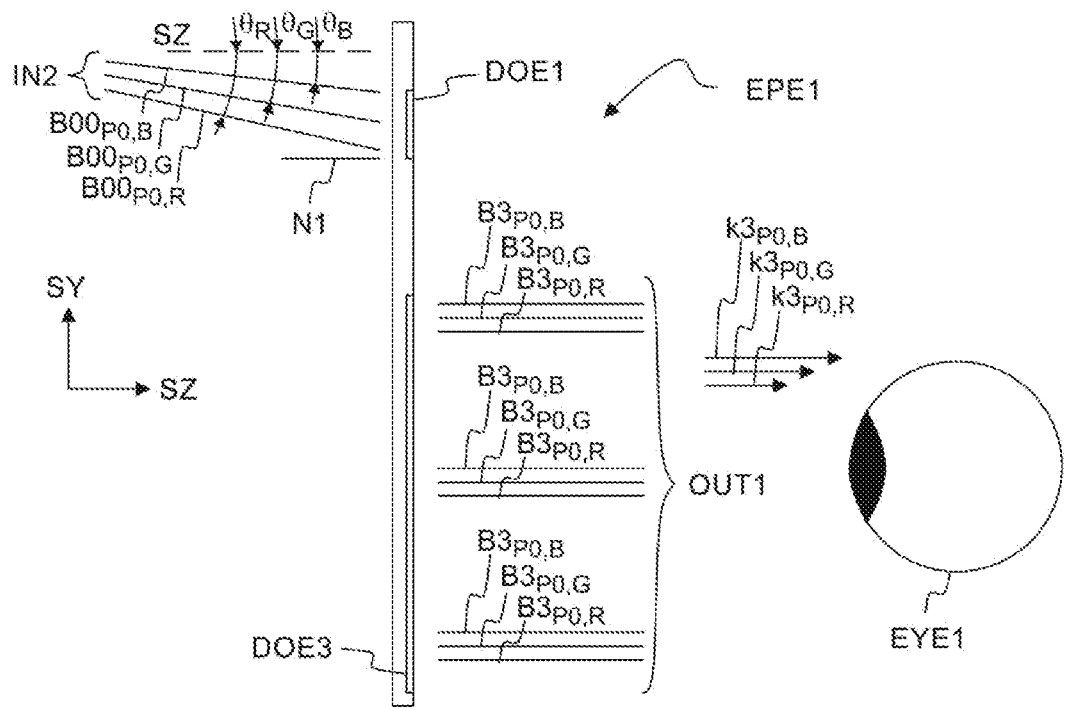
FIG. 5b shows, by way of example, in a side view, input light beams for compensating angular dispersion of the expander device.

Referring to FIG. 5b, the output light OUT1 may comprise output light beams $B3_{P0,R}$, $B3_{P0,B}$, $B3_{P0,G}$. The expander device EPE1 may form the output light beams $B3_{P0,R}$, $B3_{P0,B}$, $B3_{P0,G}$ by diffractively expanding the deflected light beams $B00_{P0,R}$, $B00_{P0,B}$, $B00_{P0,G}$.

$\theta_R$ may denote a direction of the first deflected light beam $B00_{P0,R}$ with respect to the direction SZ. OB may denote a direction of the second deflected light beam $B00_{P0,B}$ with respect to the direction SZ. $\theta_G$ may denote a direction of the third deflected light beam $B00_{P0,G}$ with respect to the direction SZ. The output light beams $B3_{P0,R}$, $B3_{P0,B}$, $B3_{P0,G}$ may have wave vectors $k3_{P0,R}$, $k3_{P0,B}$, $k3_{P0,G}$.

The modifying unit ECU1 may be arranged to form the deflected light beams $B00_{P0,R}$, $B00_{P0,B}$, $B00_{P0,G}$ such that the corresponding output light beams $B3_{P0,R}$, $B3_{P0,B}$, $B3_{P0,G}$ are e.g. parallel with the direction SZ. The directions $\theta_R$, $\theta_B$, $\theta_G$ of the light beams $B00_{P0,R}$, $B00_{P0,B}$, $B00_{P0,G}$ of the second input light IN2 may be selected such that the corresponding output light beams $B3_{P0,R}$, $B3_{P0,B}$, $B3_{P0,G}$ are e.g. parallel with the direction SZ.

Figure 5C:
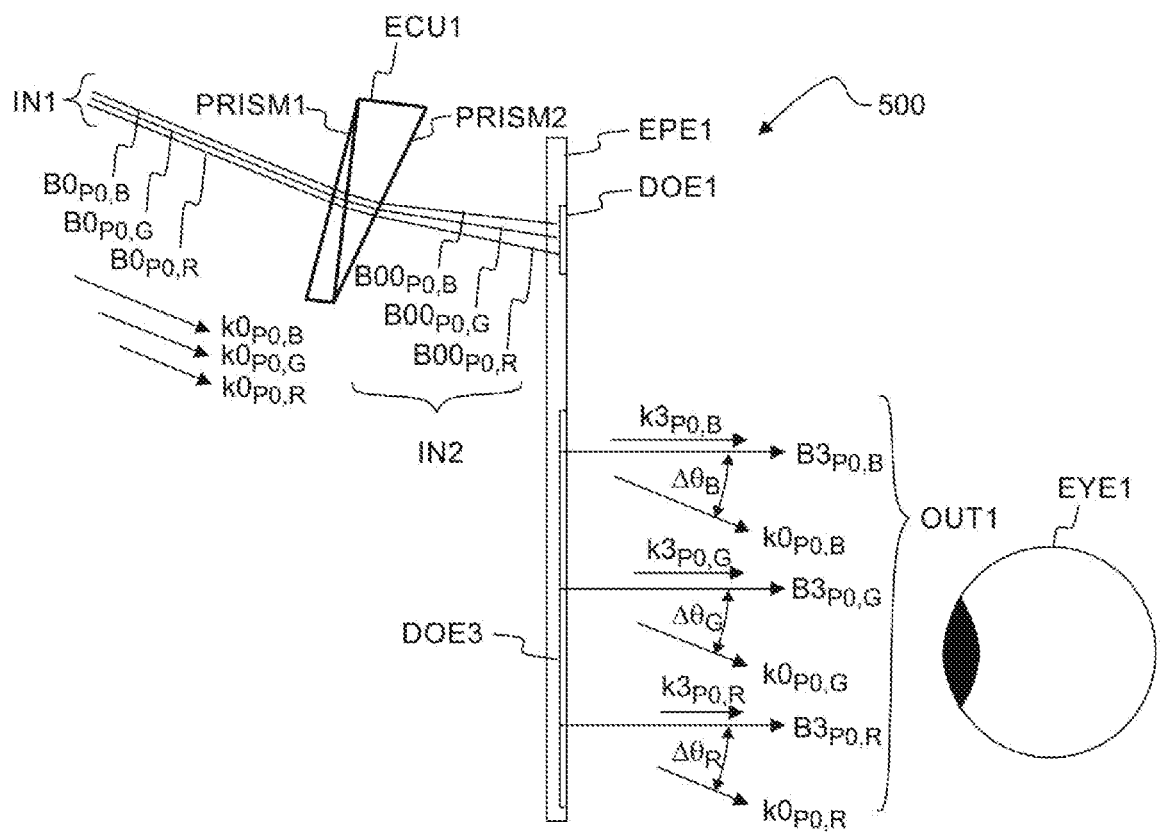
FIG. 5c shows, by way of example, in a side view, using the modifying unit for compensating angular dispersion of the expander device.

Referring to FIG. 5c, the display apparatus 500 may form a first output light beam $B3_{P0,R}$ from light of a first input light beam $B0_{P0,R}$. The display apparatus 500 may form a second output light beam $B3_{P0,B}$ from light of a second input light beam $B0_{P0,B}$. The display apparatus 500 may form a third output light beam $B3_{P0,G}$ from light of a third input light beam $B0_{P0,G}$. The first input light beam $B0_{P0,R}$ and the first output light beam $B3_{P0,R}$ have a first color, e.g. red (R). The second input light beam $B0_{P0,B}$ and the second output light beam $B3_{P0,B}$ have a second color, e.g. blue (B). The third input light beam $B0_{P0,G}$ and the third output light beam $B3_{P0,G}$ have a third color, e.g. green (G).

The first input light IN1 may comprise the input light beams $B0_{P0,R}$, $B0_{P0,B}$, $B0_{P0,G}$. The second input light IN2 may comprise deflected light beams $B00_{P0,R}$, $B00_{P0,B}$, $B00_{P0,G}$. The output light OUT1 may comprise the output light beams $B3_{P0,R}$, $B3_{P0,B}$, $B3_{P0,G}$. The modifying unit ECU1 may form deflected light beams $B00_{P0,R}$, $B00_{P0,B}$, $B00_{P0,G}$ of the second input light IN2 by refracting the input light beams $B0_{P0,R}$, $B0_{P0,B}$, $B0_{P0,G}$. The expander device EPE1 may form the output light beams $B3_{P0,R}$, $B3_{P0,B}$, $B3_{P0,G}$ by diffractively expanding the deflected light beams $B00_{P0,R}$, $B00_{P0,B}$, $B00_{P0,G}$.

A first angular deflection ($\Delta\theta_R$) may be an angular difference between a direction ($\theta_{B0,P0,R}$) of a first input light beam ($B0_{P0,R}$) having a first color (R), and a direction ($\theta_{B3,P0,R}$) of a first output light beam ($B3_{P0,R}$) formed from light of the first input light beam ($B0_{P0,R}$).

A second angular deflection ($\Delta\theta_B$) may be an angular difference between a direction ($\theta_{B0,P0,B}$) of a second input light beam ($B0_{P0,B}$) having a second color (B), and a direction ($\theta_{B3,P0,B}$) of a second output light beam ($B3_{P0,B}$) formed from light of the second input light beam ($B0_{P0,B}$).

A third angular deflection ($\Delta\theta_G$) may be an angular difference between a direction ($\theta_{B0,P0,G}$) of a third input light beam ($B0_{P0,G}$) having a third color (G), and a direction ($\theta_{B3,P0,G}$) of a third output light beam ($B3_{P0,G}$) formed from light of the third input light beam ($B0_{P0,G}$).

The modifying unit (ECU1) comprises at least a first prism (PRISM1) to reduce the magnitude of a difference ($\Delta\theta_R - \Delta\theta_B$) between the first angular deflection ($\Delta\theta_R$) and the second angular deflection ($\Delta\theta_B$).

The expander device EPE1 may comprise two or more diffractive elements DOE1, DOE2, DOE3 contributing to the direction of light in the optical path OPATH1, wherein each diffractive element DOE1, DOE2 DOE3 may have one or more grating vectors $V_1$, $V_2$, $V_3$ contributing to the direction of light in the optical path (OPATH1). The in-coupling element DOE1 of the optical path OPATH1 has a first grating vector $V_1$. The magnitude ratio (E1) of the magnitude of a sum ($\Sigma V_1$) of the grating vectors ($V_1$, $V_2$, $V_3$) to the magnitude of the first grating vector ($V_1$) may be e.g. in the range of 0.01% to 1%.

The modifying unit ECU1 may comprise at least the first prism PRISM1 to reduce a difference ($\Delta\theta_R - \Delta\theta_B$) between the first angular deflection ($\Delta\theta_R$) and the second angular deflection ($\Delta\theta_B$).

The first prism (PRISM1) may comprises a first material (MAT1) to provide first dispersion, wherein the material (MAT1), orientation ($\phi_{a1}$), and wedge angle ($\gamma 1$) of the prism (PRISM1) may be selected such that the difference ($\Delta\theta_R - \Delta\theta_B$) between the first angular deflection ($\Delta\theta_R$) and the second angular deflection ($\Delta\theta_B$) is smaller than the magnitude ratio E1 multiplied by 1°. For example, the magnitude ratio E1 may be equal to 0.5%, and the modifying unit ECU1 may compensate dispersion such that the difference $\Delta\theta_R - \Delta\theta_B$ is smaller than 0.005°. For example, the magnitude ratio E1 may be equal to 0.1%, and the modifying unit ECU1 may compensate dispersion such that the difference $\Delta\theta_R - \Delta\theta_B$ is smaller than 0.001°. For example, the magnitude ratio E1 may be equal to 0.01%, and the modifying unit ECU1 may compensate dispersion such that the difference $\Delta\theta_R - \Delta\theta_B$ is smaller than 0.0001°.

The modifying unit (ECU1) may comprise a first prism (PRISM1), wherein the first prism (PRISM1) comprises a first material (MAT1) to provide first dispersion, wherein the material (MAT1), orientation ($\phi_{a1}$), and wedge angle ($\gamma 1$) of the prism (PRISM1) may be selected such that a difference ($\Delta\theta_{RB}$) between a direction ($\theta_{B3,P0,R}$) of an output light beam ($B3_{P0,R}$) having a first color (R) and a direction ($\theta_{B3,P0,B}$) of an output light ($B3_{P0,B}$) having a second color (B) is smaller than the magnitude ratio E1 multiplied by 1° in a situation where the output light beam ($B3_{P0,R}$) having the first color (R) and the output light beam ($B3_{P0,B}$) having the second color (B) correspond to the same point (P0) of the input image (IMG0).

The modifying unit (ECU1) may comprise a first prism (PRISM1) and a second prism (PRISM2) positioned one after the other, wherein the first prism (PRISM1) comprises a first material (MAT1) to provide first dispersion, and the second prism (PRISM1) comprises a second material (MAT1) to provide second different dispersion, wherein the materials (MAT1, MAT2), orientations ($\phi_{a1}$, $\phi_{a2}$), and wedge angles ($\gamma 1$, $\gamma 2$) of the prisms (PRISM1, PRISM2) may be selected such that a difference ($\Delta\theta_{RB}$) between a direction ($\theta_{B3,P0,R}$) of an output light beam ($B3_{P0,R}$) having a first color (R) and a direction ($\theta_{B3,P0,B}$) of an output light ($B3_{P0,B}$) having a second color (B) is smaller than the magnitude ratio E1 multiplied by 1° in a situation where the output light beam ($B3_{P0,R}$) having the first color (R) and the output light beam ($B3_{P0,B}$) having the second color (B) correspond to the same point (P0) of the input image (IMG0), and wherein a difference ($\Delta\theta_{RG}$) between a direction ($\theta_{B3,P0,R}$) of the output light beam ($B3_{P0,R}$) having the first color (R) and a direction ($\theta_{B3,P0,G}$) of an output light ($B3_{P0,G}$) having a third color (G) is smaller than 0.01° in a situation where the output light beam ($B3_{P0,R}$) having the first color (R) and the output light beam ($B3_{P0,G}$) having the third color (G) correspond to the same point (P0) of the input image (IMG0).

Consequently, the display apparatus 500 may display a virtual image VIMG1 such that output light beams $B3_{P0,R}$, $B3_{P0,B}$, $B3_{P0,G}$ representing a multi-color image point P0 may be substantially parallel with each other.

Figure 5D:
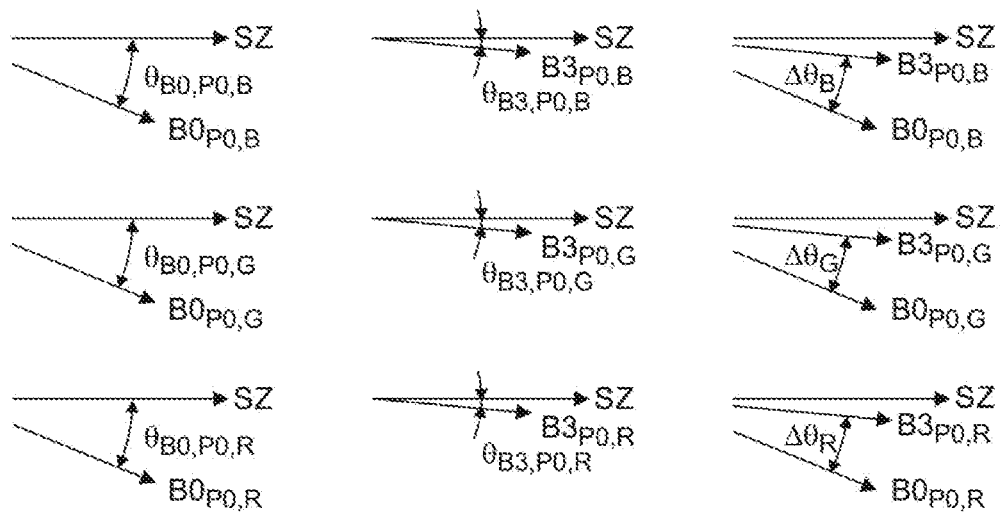
FIG. 5d shows, by way of example, directions of input light beams and directions of corresponding output light beams.

Referring to FIG. 5d, the angular deflection $\Delta\theta_R$ may denote the angular difference between the direction $\theta_{B0,P0,R}$ of an input light beam $B0_{P0,R}$ having a red color (R), and the direction $\theta_{B3,P0,R}$ of an output light beam $B3_{P0,R}$ formed from light of the input light beam $B0_{P0,R}$.

The angular deflection $\Delta\theta_B$ may denote the angular difference between the direction $\theta_{B0,P0,B}$ of an input light beam $B0_{P0,B}$ having a blue color (B), and a direction $\theta_{B3,P0,B}$ of an output light beam $B3_{P0,B}$ formed from light of the input light beam $B0_{P0,B}$.

The angular deflection $\Delta\theta_G$ may denote an angular difference between the direction $\theta_{B0,P0,G}$ of an input light beam $B0_{P0,G}$ having a green color (G), and the direction $\theta_{B3,P0,G}$ of an output light beam $B3_{P0,G}$ formed from light of the input light beam $B0_{P0,G}$.

Output light beams $B3_{P0,R}$, $B3_{P0,B}$, $B3_{P0,G}$ corresponding the center point P0 may be tilted with respect to the direction SZ. Alternatively, the output light beams $B3_{P0,R}$, $B3_{P0,B}$, $B3_{P0,G}$ corresponding the center point P0 may be substantially parallel with the direction SZ.

Figure 6A:
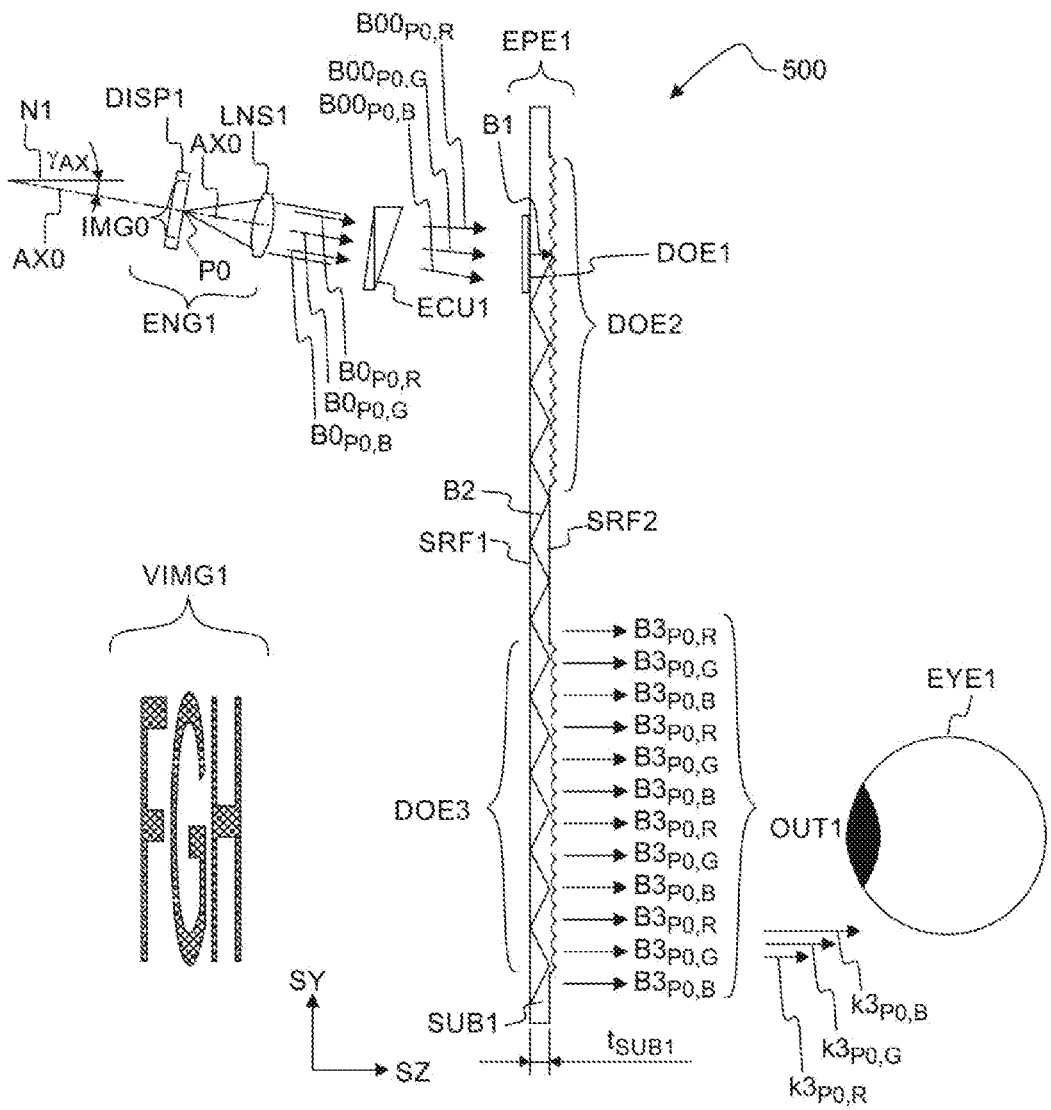
FIG. 6a shows, by way of example, in a side view, the display apparatus.

Referring to FIG. 6a, the modifying unit ECU1 may be arranged to at least partly compensate dispersion caused by the non-zero sum of the grating vectors of the expander device EPE1. The modifying unit ECU1 may compensate the dispersion of the expander device EPE1 so that output light beams $B3_{P0,R}$, $B3_{P0,B}$, $B3_{P0,G}$ corresponding to the different colors of the same point P0 of the input image IMG0 may be parallel with each other e.g. within an accuracy of 0.01°. Consequently, the output light beams $B3_{P0,R}$, $B3_{P0,B}$, $B3_{P0,G}$ may appear to originate from the same point of the displayed virtual image VIMG1.

The optical axis AX0 of the optical engine ENG1 may be tilted with respect to the surface normal N1 of the in-coupling element DOE1.

The deflected light beam $B00_{P0,R}$ and the output light beam $B3_{P0,R}$ may represent the center point (P0) of the displayed image, wherein the optical axis AX0 of the optical engine ENG1 may be tilted with respect to the direction of the output light beam $B3_{P0,R}$ so that the direction of the light beam $B00_{P0,R}$ of the second input light IN2 may be close to the direction of the output light beam $B3_{P0,R}$.

The optical axis AX0 of the optical engine ENG1 may be tilted with respect to the vector specifying the center point of the displayed virtual image VIMG1 so that the direction of the light beam $B00_{P0,R}$ may be close to said vector specifying the center point of the displayed virtual image VIMG1.

In an embodiment, the optical axis AX0 of the optical engine ENG1 may be tilted e.g. in order to compensate the beam-deflecting effect of the modifying unit ECU1 and/or in order to compensate the beam-deflecting effect of the expander device EPE1.

The waveguide plate SUB1 of the diffractive waveguiding expander device EPE1 may have major surfaces SRF1, SRF2, which are parallel with each other. $t_{SUB1}$ denotes the thickness of the waveguide plate SUB1.

The optical engine ENG1 may form an input image IMG0 and may convert the input image IMG0 into a plurality of light beams of the input light IN1. The engine ENG1 may be optically coupled to the in-coupling element DOE1 via the modifying unit ECU1.

The input image IMG0 may represent displayed information. The input image IMG0 may represent e.g. graphics and/or text. The input image IMG0 may represent e.g. video. The engine ENG1 may be arranged to generate still images and/or video. The engine ENG1 may generate a real primary image IMG0 from a digital image. The engine ENG1 may receive one or more digital images e.g. from an internet server or from a smartphone.

The expander device EPE1 may carry virtual image content obtained from the light engine ENG1 to the front of a user's eye EYE1. The expander device EPE1 may expand the viewing pupil, thus enlarging the eye box.

The engine ENG1 may comprise a micro-display DISP1 to generate an input image IMG0. The micro-display DISP1 may comprise a two-dimensional array of light-emitting pixels. The engine ENG1 may comprise e.g. one or more light emitting diodes (LED). The display DISP1 may comprise e.g. one or more micro display imagers, such as liquid crystal on silicon (LCOS), liquid crystal display (LCD), digital micromirror device (DMD). The display DISP1 may generate an input image IMG0 e.g. at a resolution of 1280×720 (HD). The display DISP1 may generate an input image IMG0 e.g. at a resolution of 1920×1080 (Full HD). The display DISP1 may generate an input image IMG0 e.g. at a resolution of 3840×2160 (4K UHD). The input image IMG0 may comprise a plurality of image points P0, P1, P2, . . . . The engine ENG1 may comprise collimating optics LNS1 to form a different light beam from each image pixel of different color. The engine ENG1 may comprise collimating optics LNS1 to form a substantially collimated light beam from light of an image point P0. The center of the display DISP1 and the center of the optics LNS1 may together define an optical axis AX0 of the engine ENG1. The orientation of the optical axis AX0 of the optical engine ENG1 is fixed with respect to the optical engine ENG1. The orientation of the optical axis AX0 is fixed with respect to the display DISP1. The center point of the active area of the display DISP1 and the center of the optics LNS1 may together define the optical axis AX0. The center point (P0) of the input image (IMG0) may coincide with the center point of the active area of the display DISP1. The symbol P0 may also refer to the center point of the active controllable display area of the display DISP1.

The optical axis AX0 may be parallel with an axial light beam ($B0_{P0,R}$) of the input light (IN1), wherein said axial light beam ($B0_{P0,R}$) corresponds to a center point (P0) of the input image (IMG0).

The optical engine ENG1 may be arranged to simultaneously project red light, green light, and blue light, so as to display a multi-color image VIMG1.

The plate SUB1 may have a first major surface SRF1 and a second major surface SRF2. The surfaces SRF1, SRF2 may be substantially parallel with the plane defined by the directions SX and SY. The first major surface SRF1 may also be called e.g. as an input surface of the plate SUB1. The second major surface SRF2 may also be called e.g. as an output surface of the plate SUB1. The input light beams may be coupled into plate SUB1 e.g. through the first major surface SRF1, wherein the output light beams may be coupled out of the plate through the second major surface SRF2. The first major surface SRF1 may also be called e.g. as an input surface of the plate SUB1. The second major surface SRF2 may also be called e.g. as an output surface of the plate SUB1.

The diffractive elements DOE1, DOE3 may be implemented on the same major surface SRF1 or SRF2.

Alternatively, the diffractive elements DOE1, DOE3 may be implemented on different major surfaces SRF1, SRF2 of the plate SUB1. For example, the in-coupling element DOE1 may be implemented on the input surface SRF1, and the out-coupling element DOE3 may be implemented on the output surface SRF2. For example, the in-coupling element DOE1 may be implemented on the output surface SRF2, and the out-coupling element DOE3 may be implemented on the input surface SRF1.

The waveguide plate may have a thickness $t_{SUB1}$. The waveguide plate comprises a planar waveguiding core. In an embodiment, the plate SUB1 may optionally comprise e.g. one or more cladding layers, one or more protective layers, and/or one or more mechanically supporting layers. The thickness $t_{SUB1}$ may refer to the thickness of a planar waveguiding core of the plate SUB1.

The waveguide plate SUB1 may comprise or consist essentially of transparent solid material. The plate SUB1 may comprise e.g. glass, polycarbonate or polymethyl methacrylate (PMMA). The diffractive optical elements DOE1, DOE2, DOE3 may be formed e.g. by molding, embossing, and/or etching. The diffractive optical elements may be implemented e.g. by one or more surface diffraction gratings or by one or more volume diffraction gratings.

In particular, the diffractive optical elements DOE1, DOE3 may be surface diffraction gratings, which may be implemented on the same side (SRF1 or SRF2) of the waveguide plate SUB1. Forming the elements DOE1, DOE3 on the same side may facilitate the production.

The diffractive elements may be produced by using lithographic techniques. For example, one or more embossing tools may be produced by e-beam lithography, and the diffraction gratings of the out-coupling elements may be formed by using the one or more embossing tools.

In an embodiment, a significant error in a dimension and/or in a position of an embossing tool may be tolerated, thanks to using the modifying unit to compensate the effect of said error.

Figure 6B:
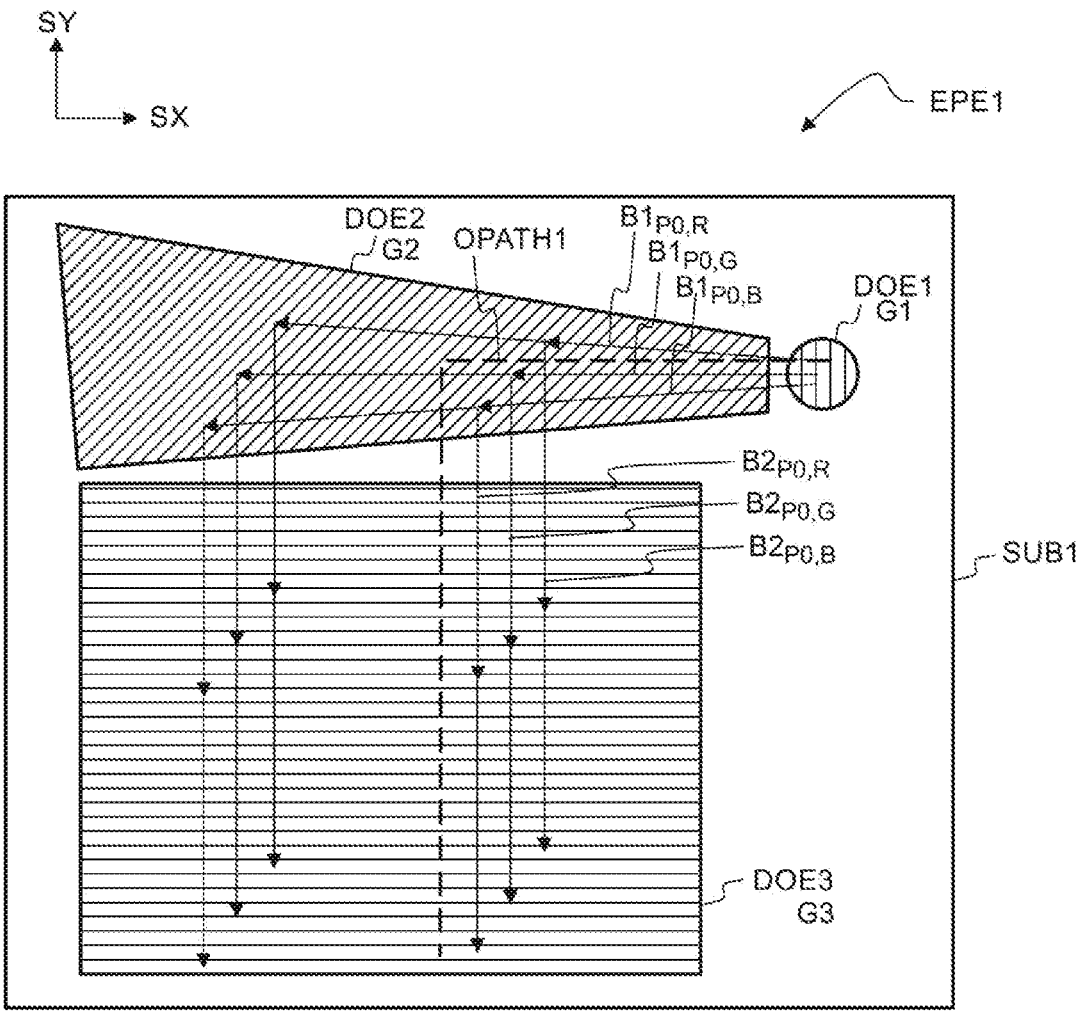
FIG. 6b by way of example, in an axial view, propagation of guided light in the waveguide plate.

FIG. 6b shows, by way of example, propagation of light in the waveguide plate SUB1. The expander device EPE1 may comprise an in-coupling element DOE1, an expander element DOE2, and an out-coupling element DOE3, which belong to the optical path OPATH1. The in-coupling element DOE1 may form first guided light beams $B1_{P0,R}$, $B1_{P0,B}$, $B1_{P0,G}$ by diffracting light beams $B00_{P0,R}$, $B00_{P0,B}$, $B00_{P0,G}$ of the second input light IN2. The expander element DOE2 may form second guided light beams $B2_{P0,R}$, $B2_{P0,B}$, $B2_{P0,G}$ by diffracting the first guided light beams $B1_{P0,R}$, $B1_{P0,B}$, $B1_{P0,G}$. The out-coupling element DOE3 may form output light beams $B3_{P0,R}$, $B3_{P0,B}$, $B3_{P0,G}$ by diffracting the second guided light beams $B2_{P0,R}$, $B2_{P0,B}$, $B2_{P0,G}$.

The sum of the grating vectors $V_1$, $V_2$, $V_3$ of the contributing elements DOE1, DOE2, DOE3 may slightly deviate from zero. For example, the grating period of the expander element DOE2 may be slightly erroneous. The light beams $B00_{P0,R}$, $B00_{P0,B}$, $B00_{P0,G}$ of the second input light IN2 may be arranged to propagate in different directions so as to compensate dispersion caused by the non-zero sum of the grating vectors.

Referring to FIGS. 7a to 7e, the optical engine ENG1 may form first input light IN1, which represents an input image IMG0. The optical engine ENG1 may comprise a display DISP1 and collimating optics LNS1. The display DISP1 may be arranged to display an input image IMG0. The display DISP1 may also be called e.g. as a micro display. The display DISP1 may also be called e.g. as a spatial intensity modulator. The input image IMG0 may also be called e.g. as a primary image.

The input image IMG0 may comprise a center point P0 and four corner points P1, P2, P3, P4. P1 may denote an upper left corner point. P2 may denote an upper right corner point. P3 may denote a lower left corner point. P4 may denote a lower right corner point. The input image IMG0 may comprise e.g. the graphical characters "F", "G", and "H". The input image IMG0 may represent displayed information.

The input image IMG0 may be a multi-color image. The input image IMG0 may be e.g. an RGB image, which may comprise a red partial image, a green partial image, and a blue partial image. Each image point may provide e.g. red light, green light and/or blue light. The input image IMG0 may be formed e.g. by modulating laser light or by modulating light obtained from one or more light emitting diodes.

The optical engine ENG1 may provide input light IN1, which may comprise a plurality of substantially collimated light beams (B0). For example, each red light beam may propagate in a different direction and may correspond to a different point of the input image IMG0. Each light beam may have a color. For example, the subscript "R" may refer to the red color. For example, a red light beam $B0_{P1,R}$ may correspond to an image point P1, and may propagate in the direction of a wave vector $k0_{P1,R}$. The red light beam corresponding to the image point P1 may propagate in the direction specified by the wave vector $k0_{P1,R}$. A red light beam $B0_{P2,R}$ may correspond to an image point P2, and may propagate in the direction of a wave vector $k0_{P2,R}$. A red light beam $B0_{P3,R}$ may correspond to an image point P3, and may propagate in the direction of a wave vector $k0_{P3,R}$. A red light beam $B0_{P4,R}$ may correspond to an image point P4, and may propagate in the direction of a wave vector $k0_{P4,R}$. The light $B0_{P0,R}$ of the center point P0 may propagate in an axial direction ($k0_{P0,R}$). The axial direction ($k0_{P0,R}$) may be parallel with an optical axis (AX0) of the optical engine ENG1.

The optical axis AX0 of the optical engine ENG1 may also be tilted with respect to the direction SZ (e.g. as shown in FIG. 6a).

The wave vector (k) of light may be defined as the vector having a direction of propagation of said light, and a magnitude given by $2\pi/\lambda$, where $\lambda$ is the wavelength of said light.

Figure 7A:
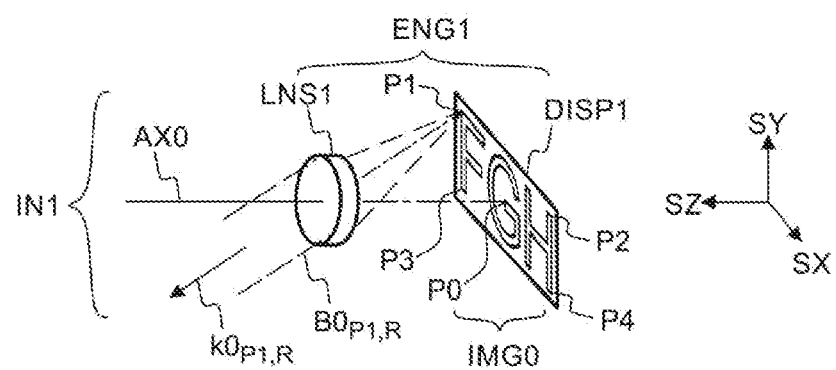
FIGS. 7a to 7e show, by way of example, in a three-dimensional view, forming input light beams by using an optical engine.
Figure 7B:
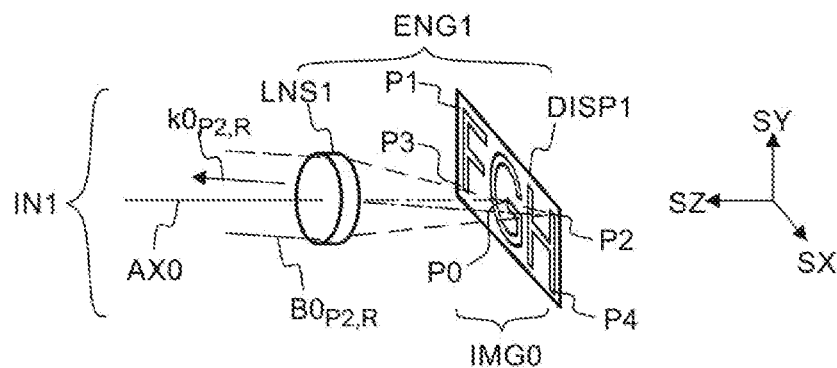
Figure 7C:
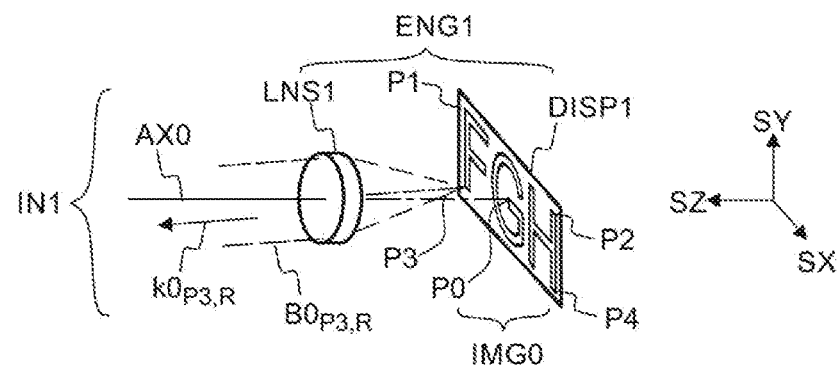
Figure 7D:
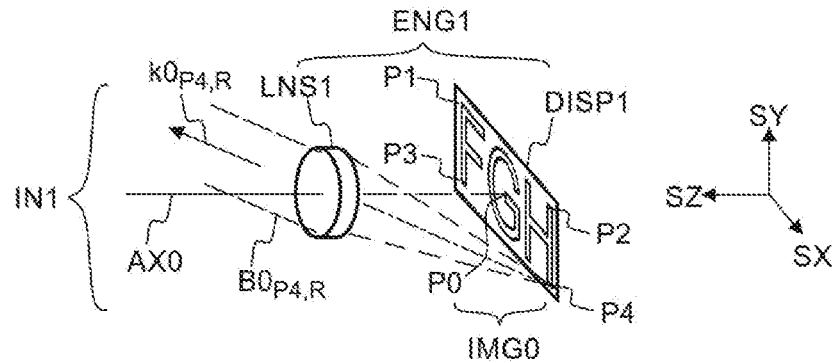
Figure 7E:
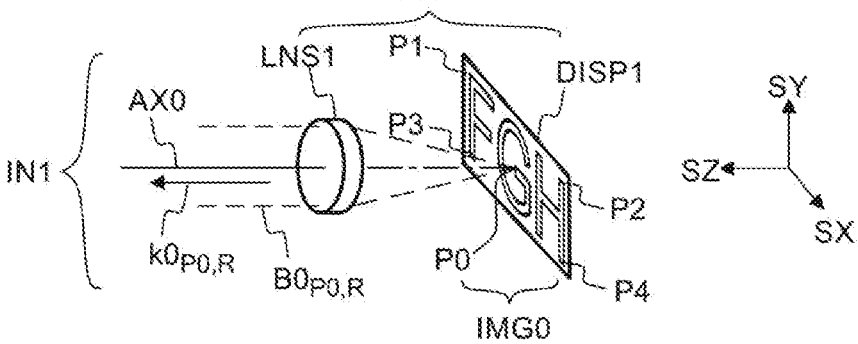
Figure 7F:
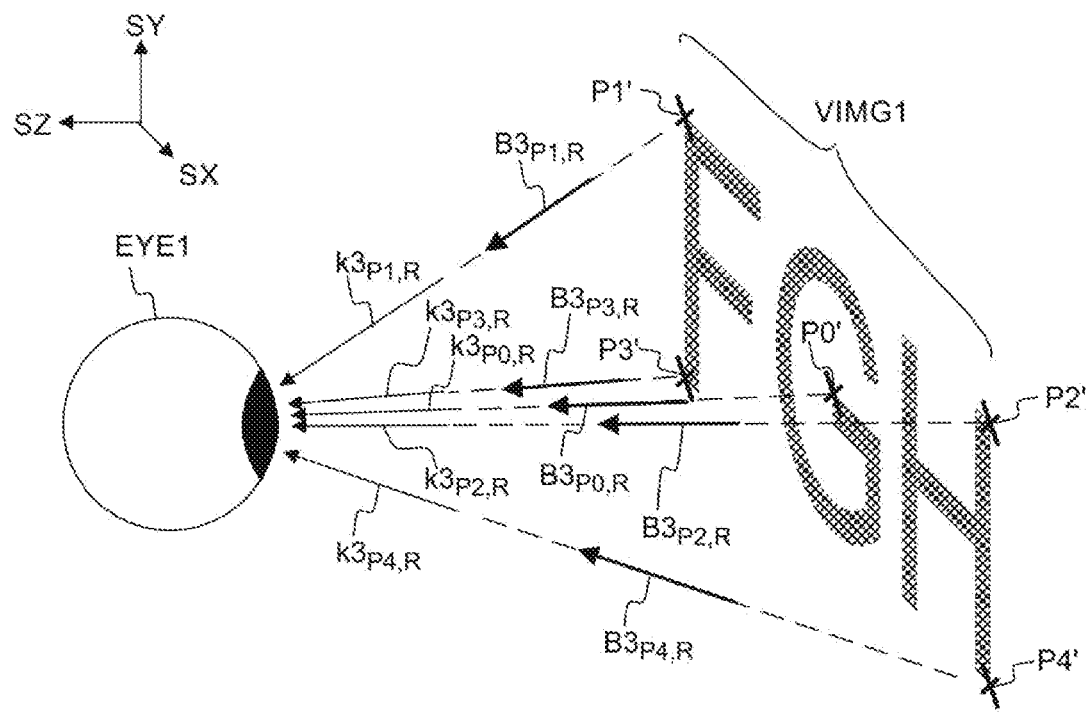
FIG. 7f shows, by way of example, in a three-dimensional view, viewing a displayed virtual image.

Referring to FIG. 7f, the output light OUT1 may comprise a plurality of output light beams $B3_{P1,R}$, $B3_{P2,R}$, . . . , which may correspond to a displayed virtual image VIMG1. Each output beam $B3_{P1,R}$, $B3_{P2,R}$, . . . may correspond to a point P1', P2', . . . of the image. For example, a red light beam $B3_{P0,R}$ propagating in a direction of a wave vector $k3_{P0,R}$ may correspond to a point P0' of the image VIMG1. A red light beam $B3_{P1,R}$ propagating in a direction of a wave vector $k3_{P1,R}$ may correspond to a point P1' of the image VIMG1. A red light beam $B3_{P2,R}$ propagating in a direction of a wave vector $k3_{P2,R}$ may correspond to a point P2' of the image VIMG1. A red light beam $B3_{P3,R}$ propagating in a direction of a wave vector $k3_{P3,R}$ may correspond to a point P3'. A red light beam $B3_{P4,R}$ propagating in a direction of a wave vector $k3_{P4,R}$ may correspond to a point P4'.

The light beam $B3_{P0,R}$ which corresponds to the center point P0 of the input image IMG0 may be tilted with respect to the direction SZ, or parallel with the direction SZ.

The expander device EPE1 may form the output light OUT1 by expanding the exit pupil of the optical engine ENG1. The output light OUT1 may comprise a plurality of output light beams, which correspond to the displayed virtual image VIMG1. The output light OUT1 may impinge on the eye EYE1 of an observer such that the observer may see the displayed virtual image VIMG1.

The displayed virtual image VIMG1 may have a center point P0' and four corner points P1', P2', P3', P4'. The input light IN1 may comprise a plurality of partial light beams corresponding to the points P0, P1, P2, P3, P4 of the input image IMG0. The expander device EPE1 may form the point P0' of the displayed virtual image VIMG1 e.g. by diffracting and guiding light of the point P0 of the input image IMG0.

The expander device EPE1 may form the points P1', P2', P3', P4' e.g. by diffracting and guiding light of the points P1, P2, P3, P4, respectively.

The expander device EPE1 may form output light OUT1, which comprises a plurality of light beams $B3_{P0,R}$, $B3_{P1,R}$, $B3_{P2,R}$, $B3_{P3,R}$, $B3_{P4,R}$ propagating in different directions specified by the wave vectors $k3_{P0,R}$, $k3_{P1,R}$, $k3_{P2,R}$, $k3_{P3,R}$, $k3_{P4,R}$.

A red light beam corresponding to the point P0' of the displayed virtual image VIMG1 has a wave vector $k3_{P0,R}$. A red light beam corresponding to the point P1' has a wave vector $k3_{P1,R}$. A red light beam corresponding to the point P2' has a wave vector $k3_{P2,R}$. A red light beam corresponding to the point P3' has a wave vector $k3_{P3,R}$. A red light beam corresponding to the point P4' has a wave vector $k3_{P4,R}$.

The combination of the modifying unit ECU1 and the expander device EPE1 may be arranged to deflect and expand the input light IN1 such that the angular difference between the direction of an input light beam and the direction of an output light beam formed from light of said input light beam is substantially equal for each input light beam. In other words, the angular difference between each input light beam and the corresponding output light beam may be substantially independent of the color and substantially independent of the original direction of each input light beam.

Figure 7G:
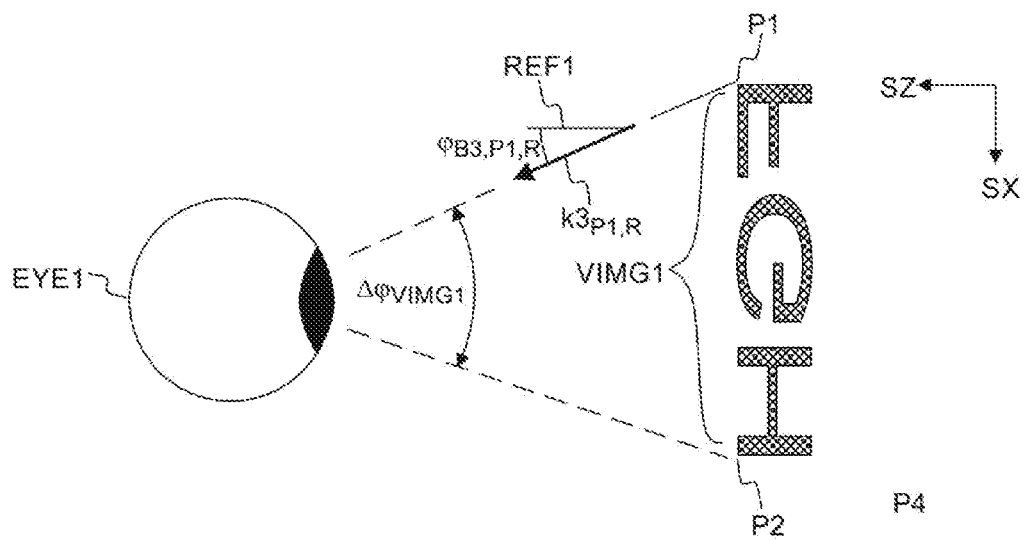
FIG. 7g shows, by way of example, angular width of the displayed virtual image.
Figure 7H:
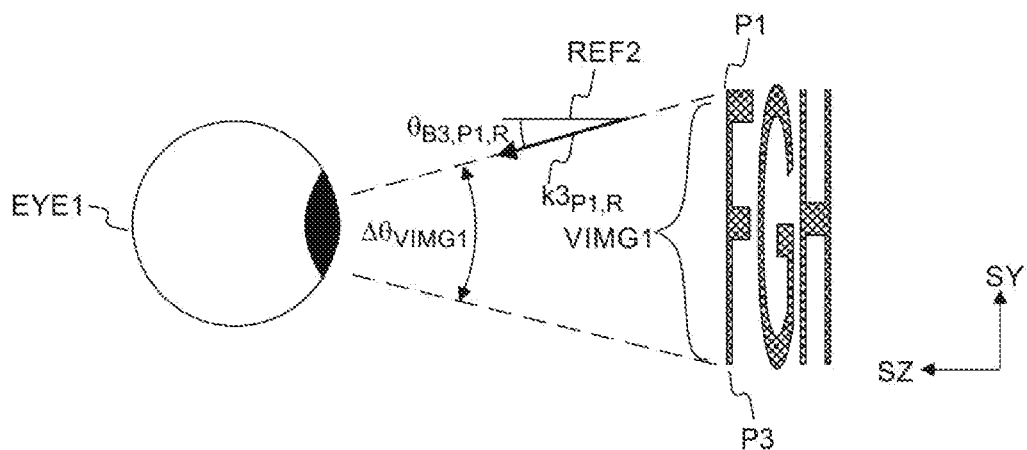
FIG. 7h shows, by way of example, angular height of the displayed virtual image.

Referring to FIGS. 7g and 7h, the displayed virtual image VIMG1 has an angular width $\Delta\varphi_{VIMG1}$ and an angular height $\Delta\theta_{VIMG1}$.

The displayed virtual image VIMG1 may have a first corner point P1' e.g. at the left-hand side of the image VIMG1, and a second corner point P2' e.g. at the right-hand side of the image VIMG1. The angular width $\Delta\varphi_{VIMG1}$ of the virtual image VIMG1 may be equal to the horizontal angle between the wave vectors $k3_{P1,R}$, $k3_{P2,R}$ of the corner points P1', P2'.

The displayed virtual image VIMG1 may have an upper corner point P1' and a lower corner point P3'. The angular height $\Delta\theta_{VIMG1}$ of the virtual image VIMG1 may be equal to the vertical angle between the wave vectors $k3_{P1,R}$, $k3_{P3,R}$ of the corner points P1', P3'.

The direction of a light beam may be specified e.g. by orientation angles $\varphi$ and $\theta$. The angle $\varphi$ may denote an angle between the direction of a light beam and a reference plane REF1. The reference plane REF1 may be defined e.g. by the directions SZ and SY. The angle $\theta$ may denote an angle between the direction of the light beam and a reference plane REF2. The reference plane REF2 may be defined e.g. by the directions SZ and SX. The direction of a red light beam corresponding to the point P1 may be fully specified by angles $\theta_{B3,P1,R}$, $\varphi_{B3,P1,R}$.

The coordinate system (SX, SY, SZ) may also be rotated such that the expander device EPE1 disperses light mainly in the vertical direction SY, wherein compensation of the dispersion may be discussed by referring to the orientation angles $\theta$.

Figure 7I:
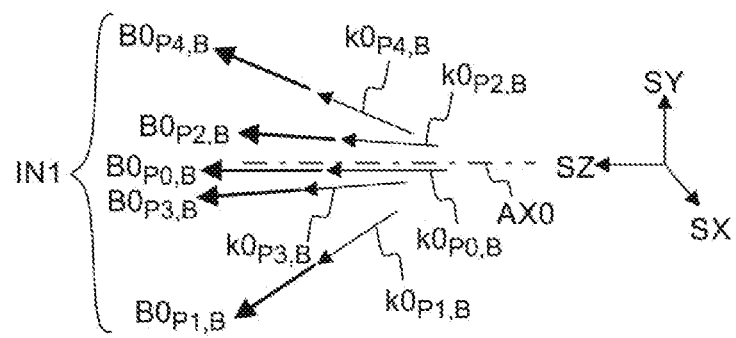
FIG. 7i shows, by way of example, in a three-dimensional view, directions of output light beams, which correspond to different points of the displayed image.

Referring to FIG. 7i, the input light IN1 may comprise red light (R), green light (G) and/or blue light (B). For example, the input light IN1 may comprise blue input light beams $B0_{P0,B}$, $B0_{P1,B}$, $B0_{P2,B}$, $B0_{P3,B}$, $B0_{P4,B}$, which have wave vectors $k0_{P0,B}$, $k0_{P1,B}$, $k0_{P2,B}$, $k0_{P3,B}$, $k0_{P4,B}$, corresponding to blue points P0, P1, P2, P3, P4 of the image IMG0. For example, the notation $k0_{P2,B}$ may refer to the wave vector of an input light beam $B0_{P2,B}$, which has blue color (B), and which corresponds to an image point P2.

Figure 8:
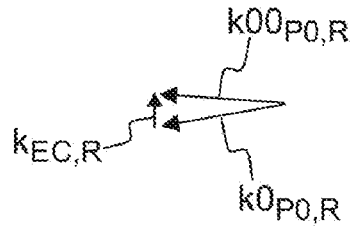
FIG. 8 shows, by way of example, an error-compensating wave vector of the modifying unit.

Referring to FIG. 8, the modifying unit ECU1 may be interpreted to form the wave vector $k00_{P0,R}$ of a deflected light beam $B00_{P0,R}$ by adding a compensating wave vector $k_{EC,R}$ to the wave vector $k0_{P0,R}$ of the corresponding input light beam $B0_{P0,R}$.

The dimensions, the materials, and the orientations of the prisms PRISM1, PRISM2 may be selected such that the modifying unit ECU1 at least partly compensate the dispersion caused by the non-zero sum of the grating vectors of the elements of the expander device EPE1.

Figure 9:
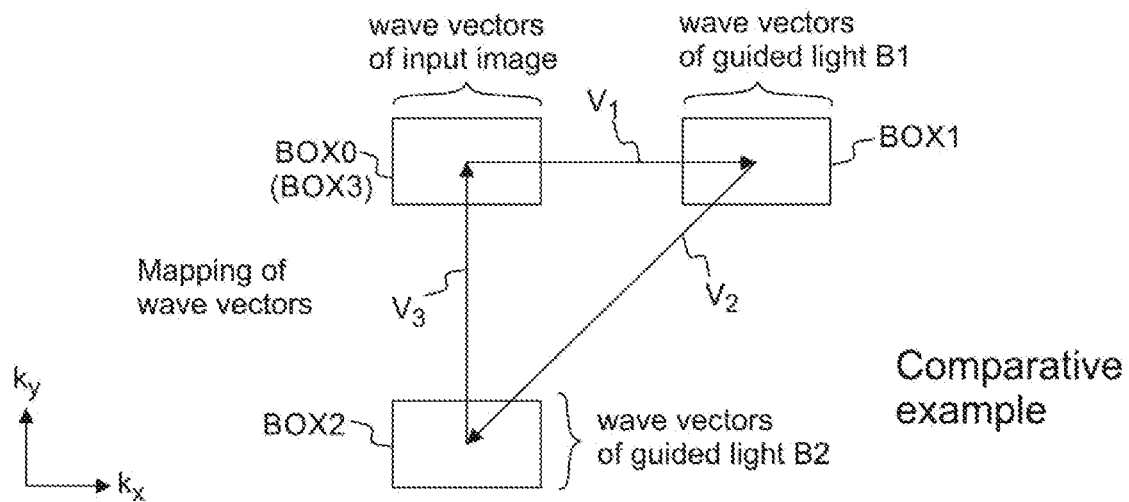
FIG. 9 shows, as a comparative example, mapping of wave vectors of input light beams in a situation where the sum of the grating vectors is equal to zero.

FIG. 9 shows mapping of wave vectors in a comparative diffractive expander device where the sum of the grating vectors $V_1$, $V_2$, $V_3$ is equal to zero. The wave vectors of input light beams representing a given color of an input image may be within an input region BOX0 in a wave vector space. The wave vector space may be defined by orthogonal wave vectors $k_x$, $k_y$. A diffractive in-coupling element may form first guided light B1 from the input light such that the wave vectors of the first guided light B1 are within a region BOX1. A diffractive expander element may form second guided light B2 from the first guided light such that the wave vectors of the second guided light B2 are within a region BOX2. A diffractive out-coupling element may form output light OUT1 from the second guided light B2 such that the wave vectors of the output light OUT1 are within an output region BOX3. The output region BOX3 may coincide with the input region BOX0 in a situation where the sum of the grating vectors $V_1$, $V_2$, $V_3$ is equal to zero. Each output light beam may be parallel with the corresponding input light beam.

Figure 10A:
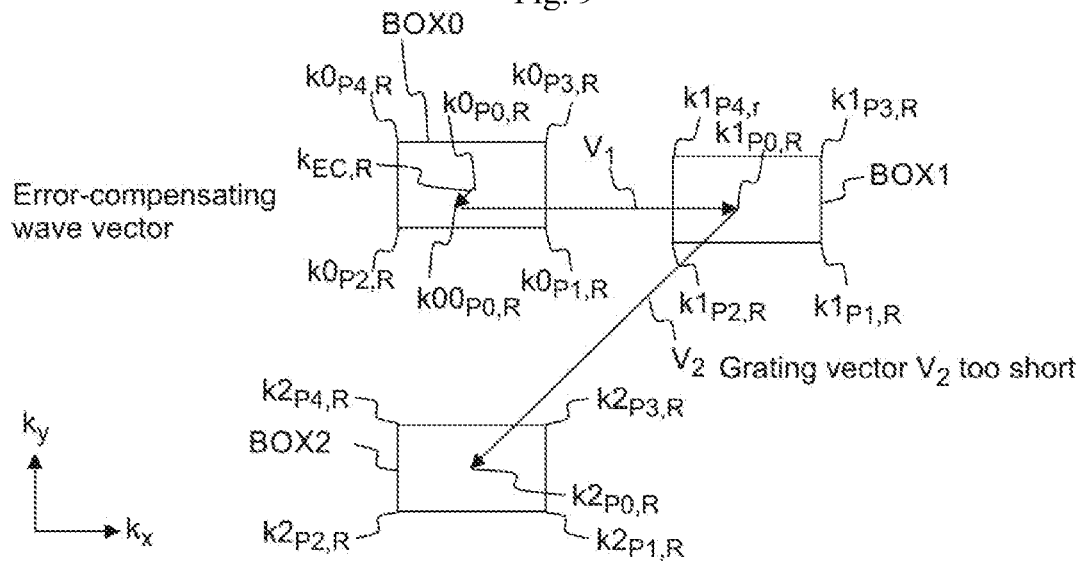
FIG. 10a shows, by way of example, mapping of wave vectors of input light beams, which are expanded by the expander device.
Figure 10B:
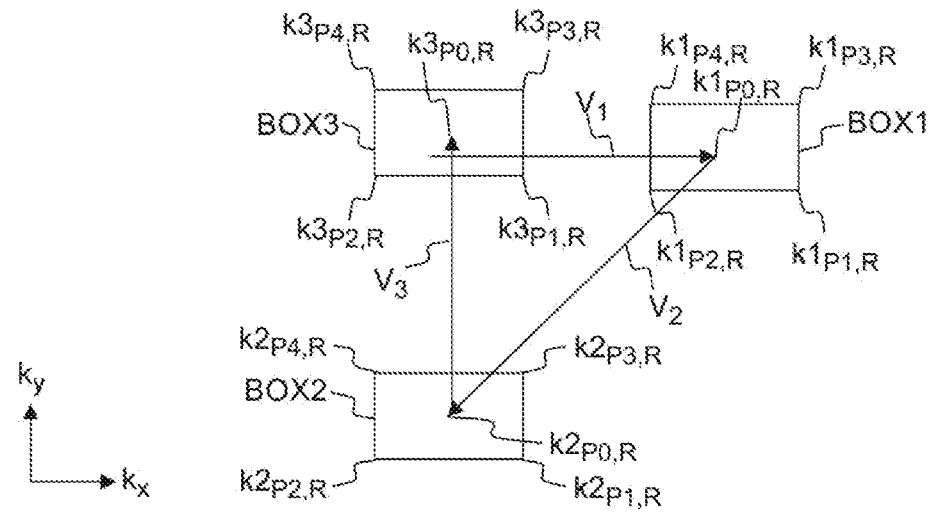
FIG. 10b shows, by way of example, mapping of wave vectors of guided light beams, which propagate via the expander device.

FIGS. 10a and 10b show, by way of example, mapping of wave vectors in a diffractive expander device where the sum of the grating vectors $V_1$, $V_2$, $V_3$ deviates from zero. For example, the grating period $d_2$ of the expander grating DOE2 may be slightly too long, wherein the grating vector $V_2$ of the expander grating DOE2 may be too short, respectively.

The wave vectors of red input light beams of the first input light IN1 may be within an input region BOX0 in the wave vector space. The modifier unit ECU1 may form the deflected input light IN2 by adding a compensating wave vector $k_{EC}$ to each input light beam of a given color. For example, the modifier unit ECU1 may add a compensating wave vector $k_{EC,R}$ to each red input light beam formed by the optical engine ENG1. The in-coupling element DOE1 may form first guided light B1 from the second input light IN2 such that the wave vectors of the first guided light B1 are within a region BOX1. The expander element DOE2 may form second guided light B2 from the first guided light B1 such that the wave vectors of the second guided light B2 are within a region BOX2. The out-coupling element DOE3 may form output light OUT1 from the second guided light B2 such that the wave vectors of the output light OUT1 are within an output region BOX3. The red color of the center point P0 of the input image IMG0 may correspond to a wave vector $k0_{P0,R}$ of the first input light IN1, a wave vector $k00_{P0,R}$ of the second input light IN2, a wave vector $k1_{P0,R}$ of the first guided light B1, a wave vector $k2_{P0,R}$ of the second guided light, and a wave vector $k3_{P0,R}$ of the output light OUT1. Wave vectors $k0_{P1,R}$, $k0_{P2,R}$, $k0_{P3,R}$, $k0_{P4,R}$ of the first input light IN1, wave vectors $k1_{P1,R}$, $k1_{P2,R}$, $k1_{P3,R}$, $k1_{P4,R}$ of the first guided light B1, wave vectors $k2_{P1,R}$, $k2_{P2,R}$, $k2_{P3,R}$, $k2_{P4,R}$ of the second guided light B2, and wave vectors $k3_{P1,R}$, $k3_{P2,R}$, $k3_{P3,R}$, $k3_{P4,R}$ of the output light OUT1 may represent the red color component of the corner points P1, P2, P3, P4 of the input image IMG0.

The combination of the modifying unit ECU1 and the expander device EPE1 may be arranged to operate such that the angular difference between the direction of each input light beam and the output light beam formed from light of said input light beam is substantially independent of the color of said input light beam and substantially independent of the original direction of said input light beam.

Figure 11A:
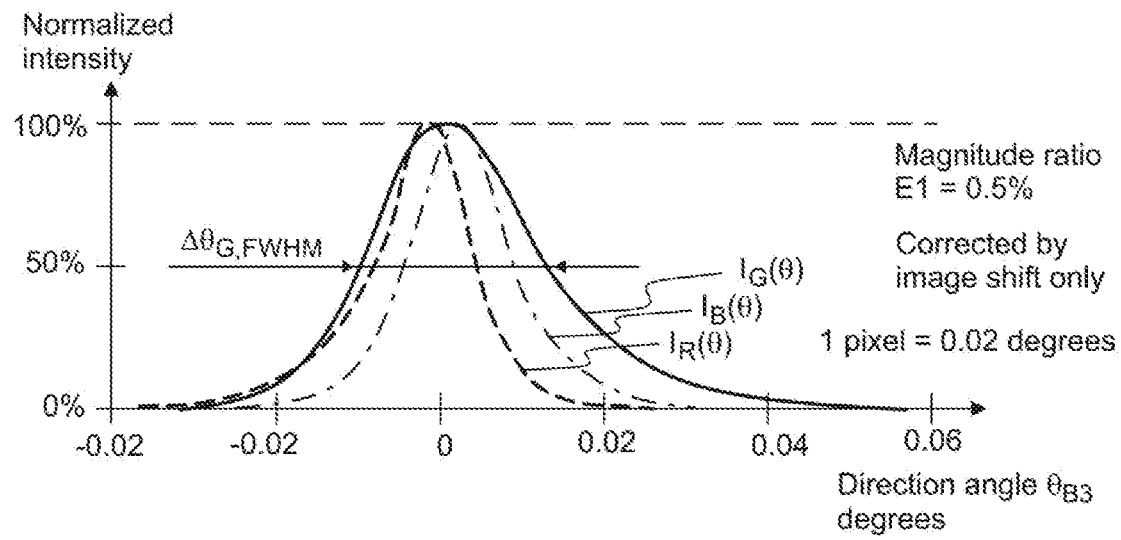
FIG. 11a shows, as a comparative example, angular intensity distribution of a red output light beam, angular intensity distribution of a green output light beam, and angular intensity distribution of a blue output light beam, in a situation where the dispersion is compensated by image shifting without a prism.

FIG. 11a shows, as a comparative example, angular intensity distributions $I_R(\theta)$, $I_B(\theta)$, $I_G(\theta)$ of output light beams $B3_{P0,R}$, $B3_{P0,B}$, $B3_{P0,G}$, which correspond to the same multi-color point of the input image IMG0. In this comparative example, the dispersion caused by the non-zero sum of the grating vectors is compensated by image shifting without using any prisms.

The multi-color input image IMG0 may comprise a red sub-image $IMG0_R$, a blue sub-image $IMG0_B$, and a green sub-image $IMG0_G$. The display DISP1 of the optical engine ENG1 may be arranged to form the multi-color input image IMG0 e.g. so that the green sub-image $IMG0_G$ and the blue sub-image $IMG0_B$ are displaced with respect to the red sub-image $IMG0_R$. (see FIG. 11d and FIG. 11e). However, the image shifting might not always allow perfect compensation of the dispersion, due to the quantized positions of the image pixels.

Furthermore, the dispersion of the expander element EPE1 may increase angular divergence (e.g. $\Delta\theta_{G,FWHM}$) of the output light beams $B3_{P0,R}$, $B3_{P0,B}$, $B3_{P0,G}$. The increase of the angular divergence cannot typically be compensated by using only image shifting.

Figure 11B:
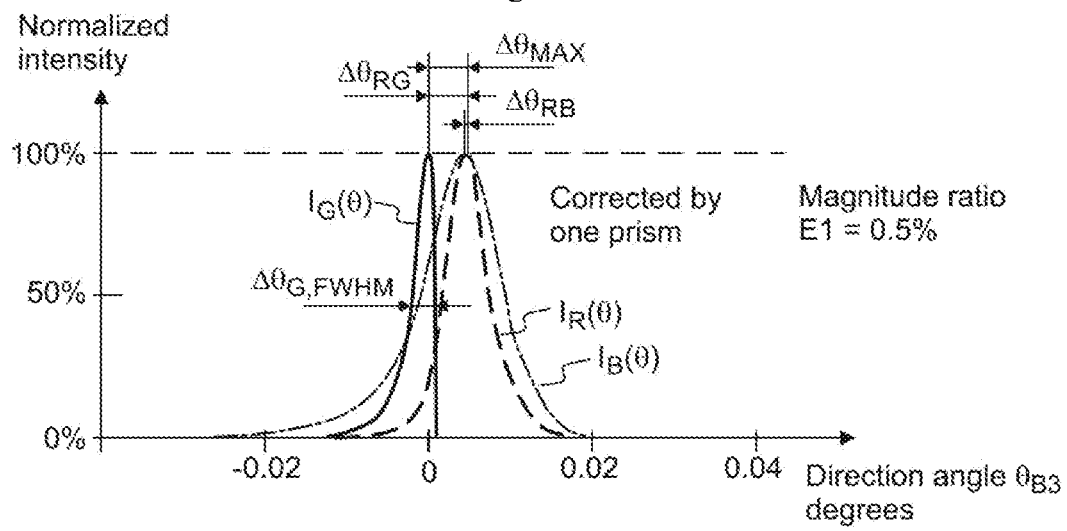
FIG. 11b shows, by way of example, angular intensity distribution of a red output light beam, angular intensity distribution of a green output light beam, and angular intensity distribution of a blue output light beam, in a situation where the dispersion is compensated by using one prism.

FIG. 11b shows, by way of example, angular intensity distributions $I_R(\theta)$, $I_B(\theta)$, $I_G(\theta)$ of output light beams $B3_{P0,R}$, $B3_{P0,B}$, $B3_{P0,G}$, which correspond to the same multi-color point of the input image IMG0. In this example, the dispersion caused by the non-zero sum of the grating vectors is compensated by using one prism PRISM1 and by image shifting.

The red output light beam $B3_{P0,R}$ may be formed from a red input light beam $B0_{P0,R}$. The blue output light beam $B3_{P0,B}$ may be formed from a blue input light beam $B0_{P0,B}$. The prism PRISM1 may be arranged to compensate the dispersion of the expander device EPE1 so that the red output light beam $B3_{P0,R}$ is substantially parallel with the blue output light beam $B3_{P0,B}$, in a situation where the red input light beam $B0_{P0,R}$ is parallel with the blue input light beam $B0_{P0,B}$.

$\Delta\theta_{RB}$ denotes the angular difference between the direction of the red output light beam $B3_{P0,R}$ and the direction of the blue output light beam $B3_{P0,B}$. An eye EYE1 perceives the red output beam as a red image point of the virtual image VIMG1, and the eye EYE1 perceives the blue output beam as a blue image point of the virtual image VIMG1. The red and blue image points of the virtual image VIMG1 may visually coincide with each other when the angular difference $\Delta\theta_{RB}$ is e.g. smaller than the resolution $\Delta\theta_{EYE}$ of the eye EYE1. The resolution $\Delta\theta_{EYE}$ of the eye EYE1 may be e.g. 0.008°.

The magnitude ratio E1 of the magnitude of the sum ($\Sigma V_1$) of the grating vectors ($V_1$, $V_2$, $V_3$) of the expander device EPE1 to the magnitude of the first grating vector ($V_1$) may be e.g. in the range of 0.01% to 1%. In particular, the magnitude ratio E1 may be in the range of 0.1% to 1%.

The prism PRISM1 may be arranged to compensate dispersion of the expander device EPE1 e.g. so that the angular difference $\Delta\theta_{RB}$ is smaller than 0.01°. The prism PRISM1 may be arranged to compensate the dispersion such that the largest angular difference $\Delta\theta_{MAX}$ between directions of output light beams of two different colors is e.g. smaller than 0.01°, in a situation where the output light beams of the different colors correspond to the same multi color image point.

The prism PRISM1 may be arranged to compensate dispersion of the expander device EPE1 so that the angular difference $\Delta\theta_{RB}$ is e.g. smaller than the magnitude ratio E1 multiplied by 1°. The prism PRISM1 may be arranged to compensate the dispersion such that the largest angular difference $\Delta\theta_{MAX}$ between directions of output light beams of two different colors is e.g. smaller than the magnitude ratio E1 multiplied by 1°, in a situation where the output light beams of the different colors correspond to the same multi-color image point.

The material MAT1, orientation $\phi_{a1}$, and wedge angle $\gamma 1$ of the prism PRISM1 may be selected so as to compensate the dispersion of the expander device EPE1 according to the one or more specified criterions.

A first angular deflection ($\Delta\theta_R$) may be an angular difference between a direction ($\theta_{B0,P0,R}$) of a first input light beam ($B0_{P0,R}$) having a first color (R), and a direction ($\theta_{B3,P0,R}$) of a first output light beam ($B3_{P0,R}$) formed from light of the first input light beam ($B0_{P0,R}$). A second angular deflection ($\Delta\theta_B$) may be an angular difference between a direction ($\theta_{B0,P0,B}$) of a second input light beam ($B0_{P0,B}$) having a second color (B), and a direction ($\theta_{B3,P0,B}$) of a second output light beam ($B3_{P0,B}$) formed from light of the second input light beam ($B0_{P0,B}$). The modifying unit ECU1 may comprise at least a first prism PRISM1 to reduce a difference ($\Delta\theta_R-\Delta\theta_B$) between the first angular deflection ($\Delta\theta_R$) and the second angular deflection ($\Delta\theta_B$). The first color may be e.g. red (R). The second color may be e.g. blue (B).

The prism PRISM1 may be arranged to compensate dispersion of the expander device EPE1 so that the difference ($\Delta\theta_R-\Delta\theta_B$) between the first angular deflection ($\Delta\theta_R$) and the second angular deflection ($\Delta\theta_B$) is e.g. smaller than 0.01°.

The prism PRISM1 may be arranged to compensate dispersion of the expander device EPE1 so that the difference ($\Delta\theta_R-\Delta\theta_B$) between the first angular deflection ($\Delta\theta_R$) and the second angular deflection ($\Delta\theta_B$) is e.g. smaller than the magnitude ratio E1 multiplied by 1°.

$\Delta\theta_{RG}$ denotes the angular deviation between the direction of the red output light beam $B3_{P0,R}$ and the direction of the green output light beam $B3_{P0,G}$. The red output light beam $B3_{P0,R}$, the blue output light beam $B3_{P0,B}$, and the green output light beam $B3_{P0,G}$ may correspond to the same multi-color point (P0) of the input image IMG0.

The method may further comprise image shifting so that also the green output light beam $B3_{P0,G}$ may be almost parallel with the red output light beam $B3_{P0,R}$.

The multi-color input image IMG0 may comprise a red sub-image $IMG0_R$, a blue sub-image $IMG0_B$, and a green sub-image $IMG0_G$. The display DISP1 of the optical engine ENG1 may be arranged to form the multi-color input image IMG0 so that e.g. the green sub-image $IMG0_G$ is displaced with respect to the red sub-image $IMG0_R$ (see FIG. 11d and FIG. 11e).

The input image IMG0 may be a multi-color image, which comprises a first sub-image $IMG0_R$ having a first color (R) and second sub-image $IMG0_G$ having a different color (G), wherein the optical engine ENG1 may be arranged to form the input image IMG0 such that the first sub-image $IMG0_R$ is displaced with respect to the second sub-image $IMG0_G$.

The prism PRISM1 may also reduce the angular divergence (e.g. $\Delta\theta_G$,FWHM) of the output light beams $B3_{P0,R}$, $B3_{P0,B}$, $B3_{P0,G}$.

The spectral bandwidth ($\Delta\lambda_{G,FWHM}$) of a broadband output light beam ($B3_{P0,G}$) may be e.g. in the range of 10 nm to 50 nm, wherein the modifying unit ECU1 may be arranged to compensate an effect of the magnitude ratio (E1) on the angular divergence ($\Delta\theta_G$,FWHM) of the broadband output light beam ($B3_{P0,G}$).

The spectral bandwidth ($0\lambda_{G,FWHM}$) of a broadband input light beam ($B3_{P0,G}$) may be e.g. in the range of 10 nm to 50 nm, wherein the modifying unit ECU1 may be arranged to compensate an effect of the magnitude ratio (E1) on a divergence ($\Delta\theta_G$,FWHM) of a broadband output light beam ($B3_{P0,G}$) formed from the broadband input light beam ($B0_{P0,G}$) such that a difference between the divergence ($\Delta\theta_{G,FWHM}$) of the broadband output light beam ($B3_{P0,G}$) and the divergence of the broadband input light beam ($B0_{P0,G}$) is smaller than said magnitude ratio E1 multiplied by 0.5°.

Figure 11C:
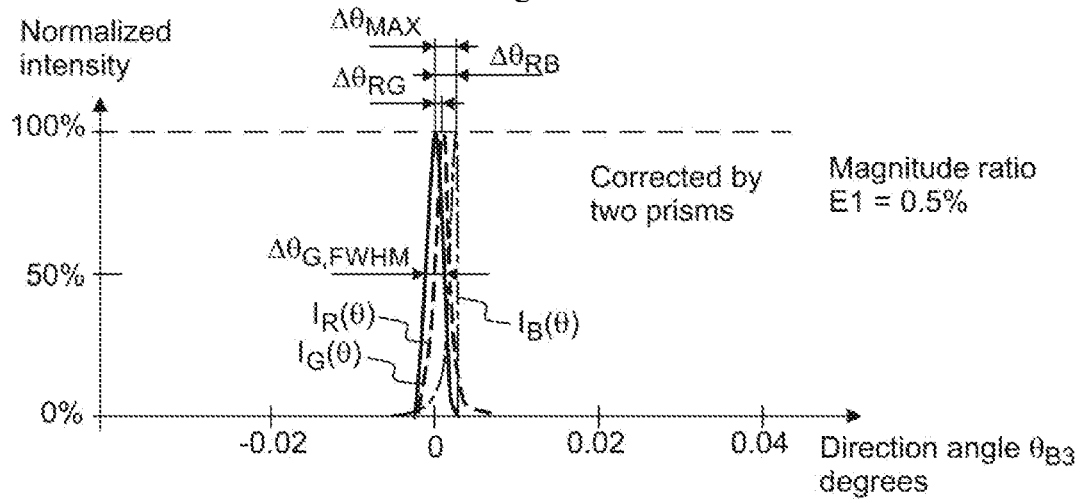
FIG. 11c shows, by way of example, angular intensity distribution of a red output light beam, angular intensity distribution of a green output light beam, and angular intensity distribution of a blue output light beam, in a situation where the dispersion is compensated by using two prisms.

FIG. 11c shows, by way of example, angular intensity distributions $I_R(\theta)$, $I_B(\theta)$, $I_G(\theta)$ of output light beams $B3_{P0,R}$, $B3_{P0,B}$, $B3_{P0,G}$, which correspond to the same multi-color point of the input image IMG0. In this example, the dispersion caused by the non-zero sum of the grating vectors is compensated by using two prisms PRISM1, PRISM2.

The red output light beam $B3_{P0,R}$ may be formed from a red input light beam $B0_{P0,R}$. The blue output light beam $B3_{P0,B}$ may be formed from a blue input light beam $B0_{P0,B}$. The green output light beam $B3_{P0,G}$ may be formed from a green input light beam $B0_{P0,G}$. The prisms PRISM1, PRISM2 of the modifying unit ECU1 may be arranged to compensate the dispersion of the expander device EPE1 so that the red output light beam $B3_{P0,R}$ is parallel with the blue output light beam $B3_{P0,B}$, in a situation where the red input light beam $B0_{P0,R}$ is parallel with blue input light beam $B0_{P0,B}$, wherein the red output light beam $B3_{P0,R}$ is also parallel with the green output light beam $B3_{P0,G}$, in a situation where the red input light beam $B0_{P0,R}$ is parallel with the green input light beam $B0_{P0,G}$.

The magnitude ratio E1 of the magnitude of the sum ($\Sigma V_1$) of the grating vectors ($V_1$, $V_2$, $V_3$) of the expander device EPE1 to the magnitude of the first grating vector ($V_1$) may be e.g. in the range of 0.01% to 1%. In particular, the magnitude ratio E1 may be in the range of 0.1% to 1%.

The prisms PRISM1, PRISM2 may be arranged to compensate dispersion of the expander device EPE1 e.g. so that the angular difference $\Delta\theta_{MAX}$ is smaller than 0.01°.

The prisms PRISM1, PRISM2 may be arranged to compensate dispersion of the expander device EPE1 e.g. so that the angular difference $\Delta\theta_{RB}$ is smaller than 0.01° and so that also the angular difference $\Delta\theta_{RG}$ is smaller than 0.01°.

The prisms PRISM1, PRISM2 may be arranged to compensate dispersion of the expander device EPE1 e.g. so that the angular difference $\Delta\theta_{RB}$ is smaller than the magnitude ratio E1 multiplied by 1°.

The prisms PRISM1, PRISM2 may be arranged to compensate dispersion of the expander device EPE1 e.g. so that the angular difference $\Delta\theta_{RB}$ is smaller than 0.01°, and wherein the angular difference $\Delta\theta_{RG}$ is smaller than the magnitude ratio E1 multiplied by 1°.

The materials MAT1, MAT2, orientations $\phi_{a1}$, $\phi_{a2}$ and wedge angles $\gamma 1$, $\gamma 2$, of the prism PRISM1 may be selected so as to compensate the dispersion of the expander device EPE1 according to one or more criterions.

The prisms PRISM1, PRISM2 may also reduce the angular divergence (e.g. $\Delta\theta_{G,FWHM}$) of the output light beams $B3_{P0,R}$, $B3_{P0,B}$, $B3_{P0,G}$.

The spectral bandwidth ($\Delta\lambda_{G,FWHM}$) of a broadband input light beam ($B3_{P0,G}$) may be e.g. in the range of 10 nm to 50 nm, wherein the modifying unit ECU1 may be arranged to compensate an effect of the magnitude ratio (E1) on a divergence ($\Delta\theta_{G,FWHM}$) of a broadband output light beam ($B3_{P0,G}$) formed from the broadband input light beam ($B3_{P0,G}$) such that a difference between the divergence ($\Delta\theta_{G,FWHM}$) of the broadband output light beam ($B3_{P0,G}$) and the divergence of the broadband input light beam ($B0_{P0,G}$) is smaller than said magnitude ratio E1 multiplied by 0.5°.

Figure 11D:
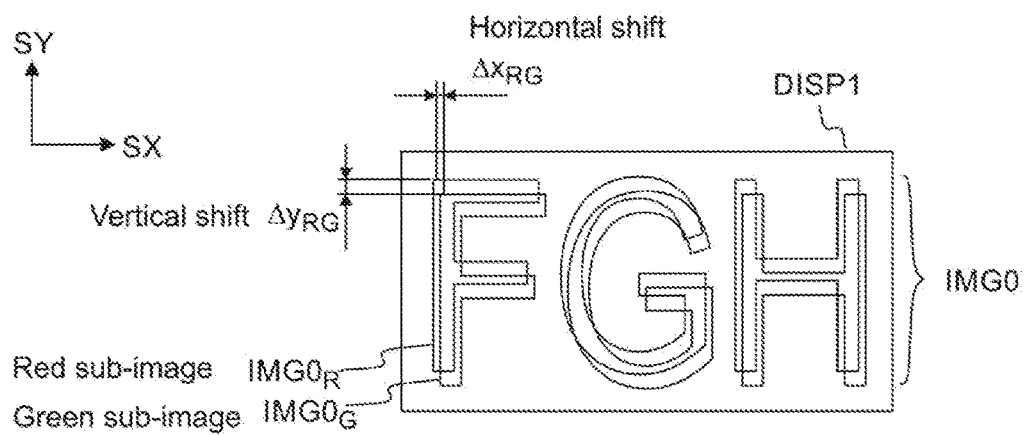
FIG. 11d shows, by way of example, a multi-color input image, which comprises a first sub-image representing a first color and a second sub-image representing a second color, wherein the second sub-image is shifted with respect to the first sub-image.
Figure 11E:
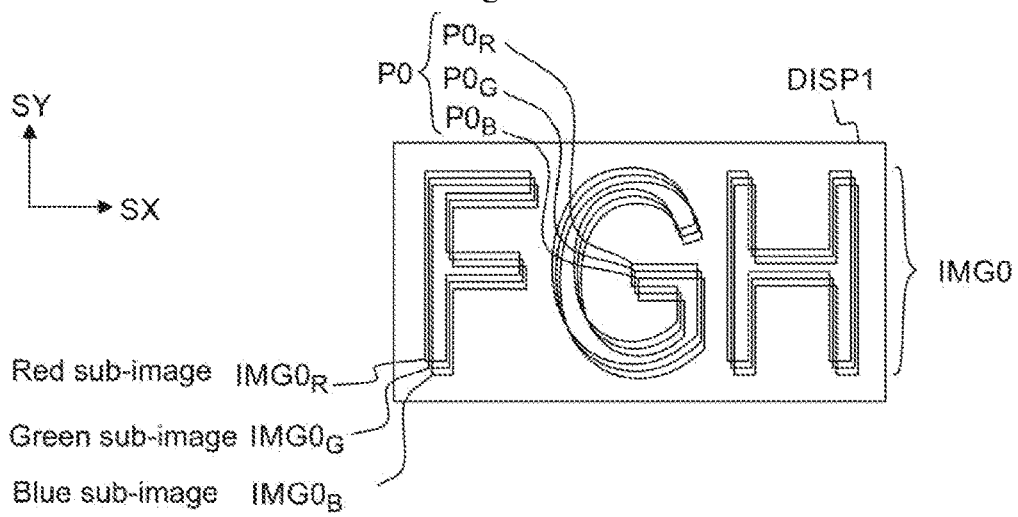
FIG. 11e shows, by way of example, a multi-color input image, which comprises a first sub-image representing a first color, a second sub-image representing a second color, and a third sub-image representing a third color.

Referring to FIGS. 11d and 11e, the multi-color input image IMG0 may comprise a red sub-image $IMG0_R$, a blue sub-image $IMG0_B$, and a green sub-image $IMG0_G$. The display DISP1 of the optical engine ENG1 may be arranged to form the multi-color input image IMG0 so that e.g. the green sub-image $IMG0_G$ is displaced with respect to the red sub-image $IMG0_R$. $\Delta y_{RG}$ may denote vertical displacement of the green sub-image $IMG0_G$ with respect to the red sub-image $IMG0_R$. $\Delta x_{RG}$ may denote horizontal displacement of the green sub-image $IMG0_G$ with respect to the red sub-image $IMG0_R$.

The input image IMG0 may be a multi-color image, which comprises a first sub-image ($IMG0_R$) having a color (e.g. red R) and second sub-image $IMG0_G$ having a different color (e.g. green G), wherein the optical engine ENG1 may be arranged to form the input image IMG0 such that the first sub-image ($IMG0_R$) is displaced with respect to the second sub-image ($IMG0_G$).

A multi-color image point P0 of the input image IMG0 may consist of single color image points $P0_R$, $P0_B$, $P0_G$. A first single color image point $P0_R$ may have a first color, e.g. red (R). A second single color image point $P0_B$ may have a second color, e.g. blue (B). A third single color image point $P0_G$ may have a third color, e.g. green (G). The multi-color image point P0 may represent e.g. a corner of a visual feature of the input image IMG0.

One ($P0_G$) of said single color image points may be displaced with respect to the other single color image points ($P0_R$,$P0_B$) such that the largest angular difference ($\Delta\theta_{MAX}$) between directions of output light beams ($B3_{P0,R}$, $B3_{P0,G}$, $B3_{P0,B}$) formed from light of said single color image points ($P0_R$,$P0_B$, $P0_G$) is smaller than 0.01°.

The optical engine ENG1 may be arranged to form a multi-color image point P0 of the input image IMG0 such that the multi-color image point P0 comprises a single color image point ($P0_R$) having a first color (R), a single color image point ($P0_B$) having a second color (B), and a single color image point ($P0_G$) having a third color (G), wherein one ($P0_G$) of said single color image points may be displaced with respect to the other single color image points ($P0_R$,$P0_B$) such that an angular difference ($\Delta\theta_{RB}$) between the direction of the output light beam ($B3_{P0,R}$) of the first color (R) and the direction of the output light beam ($B3_{P0,B}$) of the second color (B) is e.g. smaller than 0.01°, and wherein an angular difference ($\Delta\theta_{RG}$) between the direction of the output light beam ($B3_{P0,R}$) of the first color (R) and the direction of the output light beam ($B3_{P0,G}$) of the third color (G) is e.g. smaller than 0.01°.

The one or more sub-images may be displaced e.g. by performing data processing operations with image data, which is communicated to the display DISP1.

The display DISP1 of the optical engine ENG1 may comprise a two-dimensional array of display pixels. The horizontal and the vertical displacement which may be used for the image shifting is quantized by the width and the height of the pixels.

One or more sub-images may be displaced with respect to each other so that output light beams $B3_{P0,R}$, $B3_{P0,B}$, $B3_{P0,G}$, which correspond to the same multi-color point of the input image IMG0 may be substantially parallel with each other. However, image shifting without using the prisms might not always allow perfect compensation of the dispersion, due to the quantized positions of the image pixels.

Figure 12A:
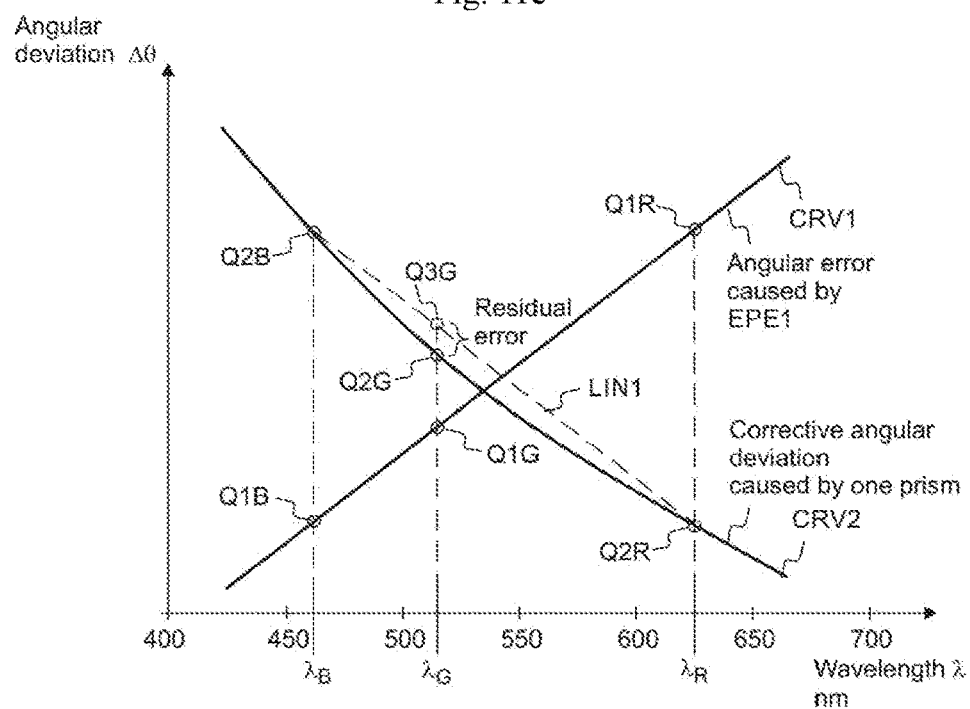
FIG. 12a shows, by way of example, using a prism for compensating angular dispersion caused by a non-zero sum of grating vectors.

FIG. 12a illustrates, by way of example, compensating the dispersion of the expander device by using one prism PRISM1.

The expander device EPE1 may cause angular error of direction of output light beams so that the angular error is a linear function of the wavelength $\lambda$, as shown by the line CRV1 in FIG. 12a. The angular error caused by the expander device EPE1 is illustrated e.g. by the angles $\theta_{B3,R}$, $\theta_{B3,G}$, $\theta_{B3,B}$ in FIG. 3c, corresponding to the points Q1R, Q1G, Q1B on the line CRV1.

The refractive prism PRISM1 may deflect light beams such that the deflection angle is almost a linear function of the wavelength $\lambda$, as shown by the curve CRV2 in FIG. 12a. The angular deflection caused by the refractive modifier unit ECU1 is illustrated e.g. by the angles $\delta_R$, $\delta_G$, $\delta_B$ in FIG. 4a, corresponding to the points Q2R, Q2G, Q2B on the curve CRV2.

The total deflection angle of each output light beam $B3_{P0,R}$, $B3_{P0,G}$, $B3_{P0,B}$ may be formed as a sum of the angular error of the EPE1 and the angular deflection of the ECU1. The material MAT1, the wedge angle $\gamma 1$, and the angular orientation $\phi 1$ of the prism PRISM1 may be selected such that a first output light beam having a first color (e.g. red) is parallel with a second output light beam having a second color (e.g. blue), in a situation where the output light beams correspond to the same point P0 of the input image IMG0.

In case of a single prism PRISM1, the compensating curve CRV2 may deviate from the straight line LIN1. Consequently, there may be a residual error in the direction of the output light beam of the third color (e.g. green).

When using two or more prisms PRISM1, PRISM2, the modifier unit ECU1 may provide angular deflection according to the points Q2R, Q3G, Q2B, which are on the straight line LIN1. The materials MAT1, MAT2, the wedge angles $\gamma 1$, $\gamma 2$, and the angular orientations $\phi 1$, $\phi 2$ of the prisms PRISM1, PRISM2 may be selected such that output light beams of the three different colors may be parallel with each other, in a situation where the output light beams correspond to the same point P0 of the input image IMG0.

Figure 12B:
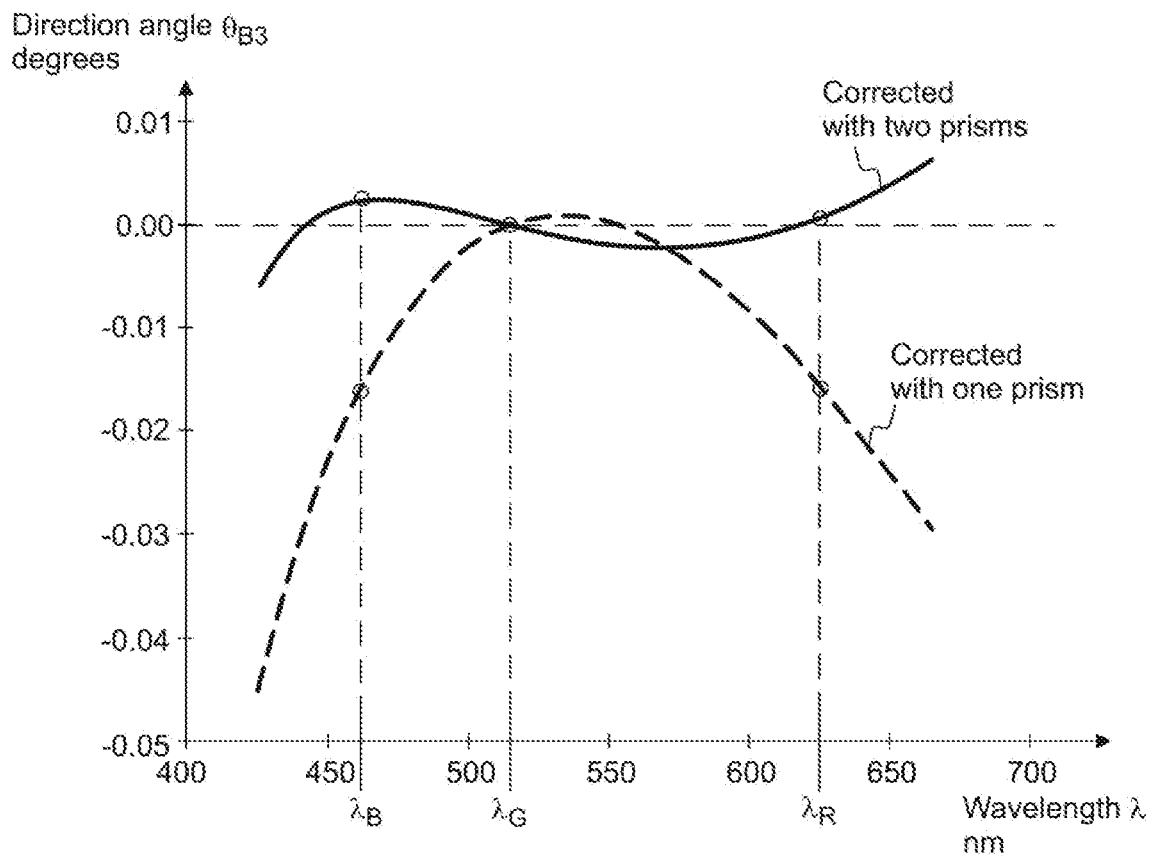
FIG. 12b shows, by way of example, angular deviation of output light beams as a function of wavelength when the dispersion is compensated by one prism, and angular deviation of output light beams as a function of wavelength when the dispersion is compensated by two prisms.

FIG. 12b shows angular direction $\theta_{B3}$ of output light beams as a function of wavelength $\lambda$.

The solid curve of FIG. 12b shows, by way of example, angular direction $\theta_{B3}$ of output light beams as a function of wavelength $\lambda$ when the dispersion of the expander device is compensated by two prisms.

The dashed curve of FIG. 12b shows, by way of example, angular direction $\theta_{B3}$ of output light beams as a function of wavelength $\lambda$ when the dispersion of the expander device is compensated by one prism.

In case of FIG. 12b, the magnitude ratio E1 of the expander device EPE1 is 0.5%.

Figure 12C:
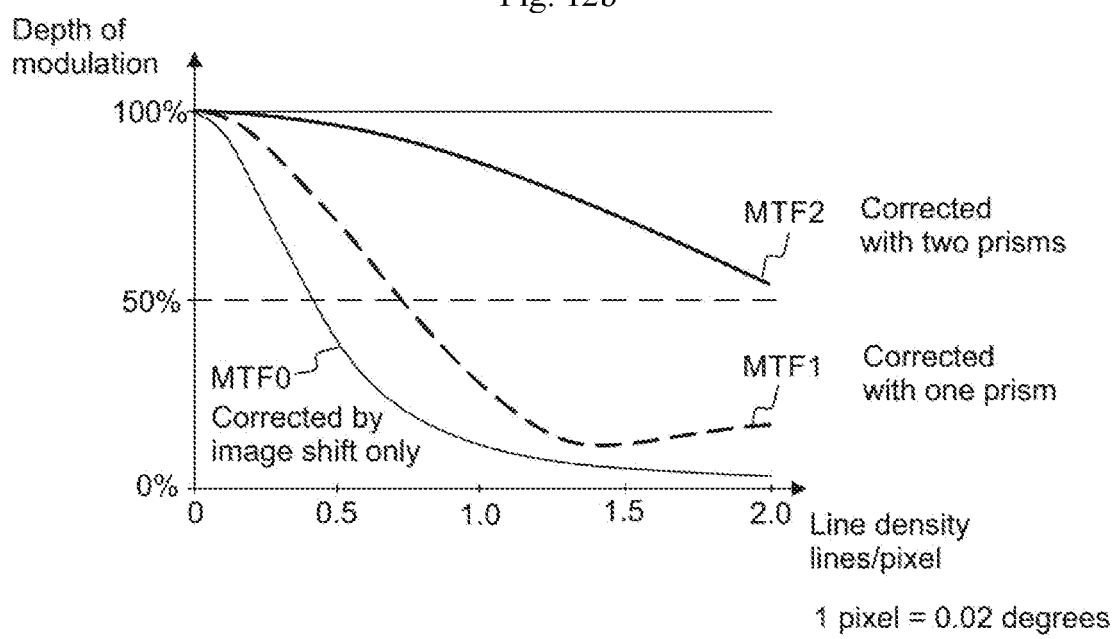
FIG. 12c shows, by way of example, the modulation transfer function of an expander device when the dispersion is compensated by image shifting without a prism, the modulation transfer function of the display apparatus when the dispersion is compensated by one prism, and the modulation transfer function of the display apparatus when the dispersion is compensated by two prisms.

FIG. 12c shows modulation transfer functions MTF1, MTF2 for the display apparatus 500. In case of FIG. 12c, the magnitude ratio E1 of the expander device EPE1 is 0.5%. The modulation transfer function MTF1 represents a situation where dispersion of the expander device EPE1 is compensated by using one prism PRISM1. The modulation transfer function MTF2 represents a situation where dispersion of the expander device EPE1 is compensated by using two prisms PRISM2. The modulation transfer function MTF0 represents a comparative situation where the refractive prisms are not used. It may be noticed that using at least one prism may provide significant increase of the modulation transfer function at high spatial frequencies.

Figure 13A:
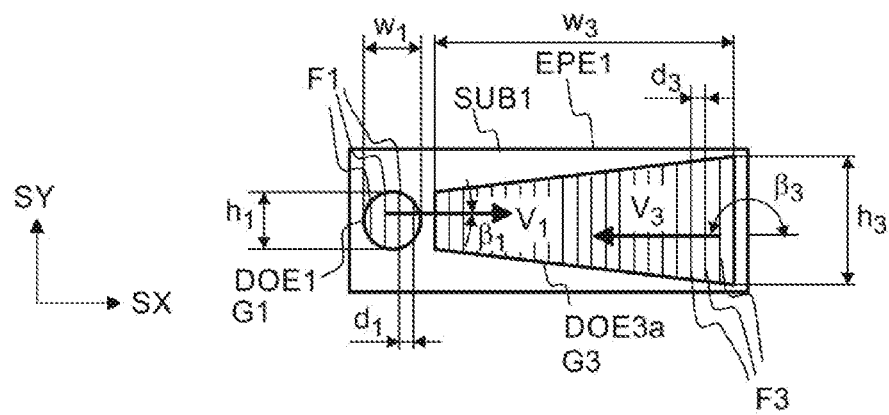
FIG. 13a shows, by way of example, in an axial view, an expander device implemented by two diffractive elements.

FIG. 13a shows a diffractive waveguiding expander device EPE1, wherein the waveguide plate SUB1 of the expander device EPE1 comprises an in-coupling element DOE1, and an out-coupling element DOE3.

The waveguide plate SUB1 may comprise:
a diffractive in-coupling element DOE1 to form first guided light B1 by diffracting the second input light IN2 into the waveguide plate SUB1, and
an out-coupling element DOE3 to form output light OUT1 by diffracting the first guided light B1 out of the waveguide plate SUB1.

In this example, the elements DOE1 and DOE3 belong to the optical path OPATH1. The grating vectors $V_1$ and $V_3$ contribute to the direction of light, which propagates via the optical path OPATH1. The magnitude ratio $E1=(\Sigma V_1)/V_1$ of the magnitude of the sum $V_1+V_3$ of the grating vectors $V_1$, $V_3$ to the grating vector $V_1$ of the in-coupling element DOE1 may be e.g. in the range of 0.01% to 1%.

Figure 13B:
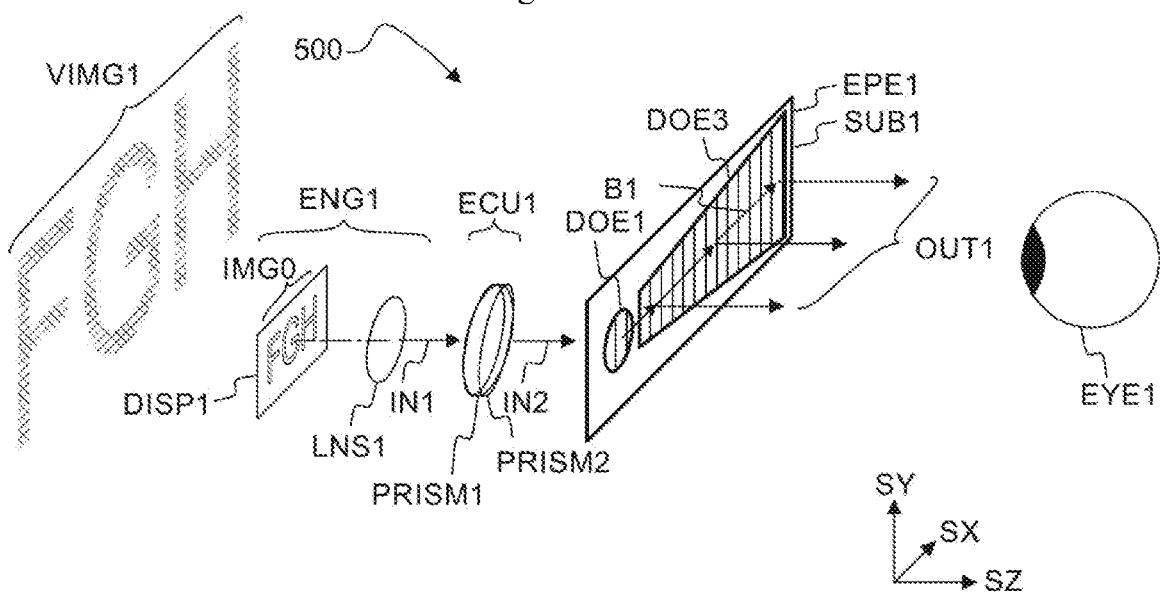

FIG. 13b shows a display apparatus 500, which comprises the optical engine ENG1, the modifier unit ECU1, and the expander device EPE1 of FIG. 13a. The modifying unit ECU1 may be arranged to compensate the dispersion caused by the non-zero sum of the grating vectors, as described above.

Figure 14A:
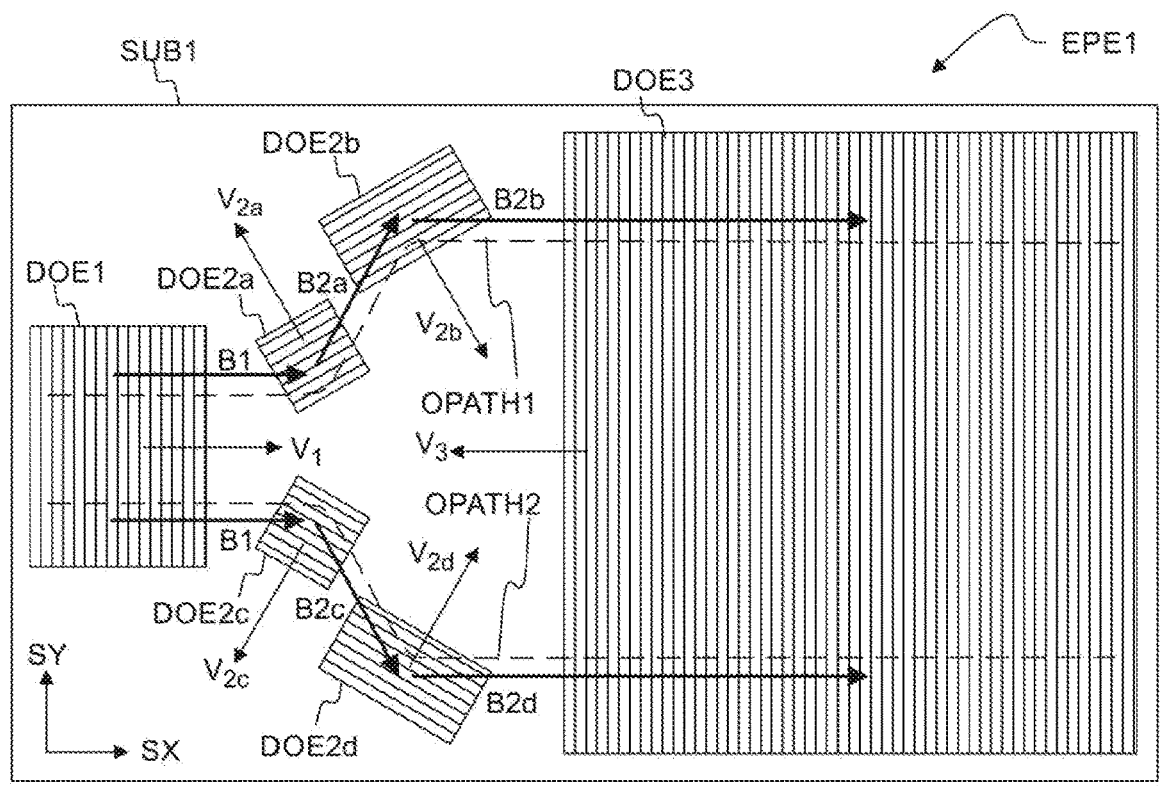
FIG. 14a shows, by way of example, in an axial view, an expander device which comprises several expander elements.

FIG. 14a shows, by way of example, a diffractive waveguiding expander device EPE1, wherein the waveguide plate SUB1 of the expander device EPE1 comprises an in-coupling element DOE1, several expander elements DOE2a, DOE2b, DOE2c, DOE2d, and an out-coupling element DOE3.

Elements DOE1, DOE2a, DOE2b, DOE3 may form a first optical path OPATH1 for guided light from the in-coupling element DOE1 to the out-coupling element DOE3. The in-coupling element DOE1 has a grating vector $V_1$. A first expander element DOE2a has a grating vector $V_2a$. A second expander element DOE2b has a grating vector $V_2b$. The out-coupling element DOE3 has a grating vector $V_3$.

The waveguide plate SUB1 may comprise:
a diffractive in-coupling element DOE1 to form first guided light B1 by diffracting input light IN2 into the waveguide plate SUB1,
a first expander element DOE2a to form second guided light B2a by diffracting the first guided light B1,
a second expander element DOE2b to form third guided light B2b by diffracting the second guided light B2b, and
a out-coupling element DOE3 to form output light OUT1 by diffracting the third guided light B2b out of the waveguide plate SUB1.

In this example, the elements DOE1, DOE2a, DOE2b, DOE3 belong to said first optical path OPATH1. The grating vectors $V_1$, $V_2a$, $V_2b$, $V_3$ contribute to the direction of light, which propagates via the first optical path OPATH1. The magnitude ratio $E1=(\Sigma V_1)/V_1$ of the magnitude of the sum $V_1+V_{2a}+V_{2b}+V_3$ of the grating vectors $V_1$, $V_{2a}$, $V_{2b}$, $V_3$ to the grating vector $V_1$ of the in-coupling element DOE1 may be e.g. in the range of 0.01% to 1%.

The waveguide plate SUB1 may optionally comprise auxiliary expander elements DOE2c, DOE2d. The elements DOE1, DOE2c, DOE2d, DOE3 may form a second optical path OPATH2 for guided light from the in-coupling element DOE1 to the out-coupling element DOE3. The elements DOE1, DOE2c, DOE2d, DOE3 may belong to the second optical path OPATH2 such that the auxiliary expander elements DOE2c, DOE2d do not belong to the first optical path OPATH1. A first auxiliary expander element DOE2c may form first auxiliary guided light B2c by diffracting the first guided light B1. A second auxiliary expander element DOE2d may form second auxiliary guided light B2d by diffracting the first auxiliary guided light B2c. The out-coupling element DOE3 may form output light OUT1 also by diffracting the second auxiliary guided light B2d out of the waveguide plate SUB1.

Figure 14B:
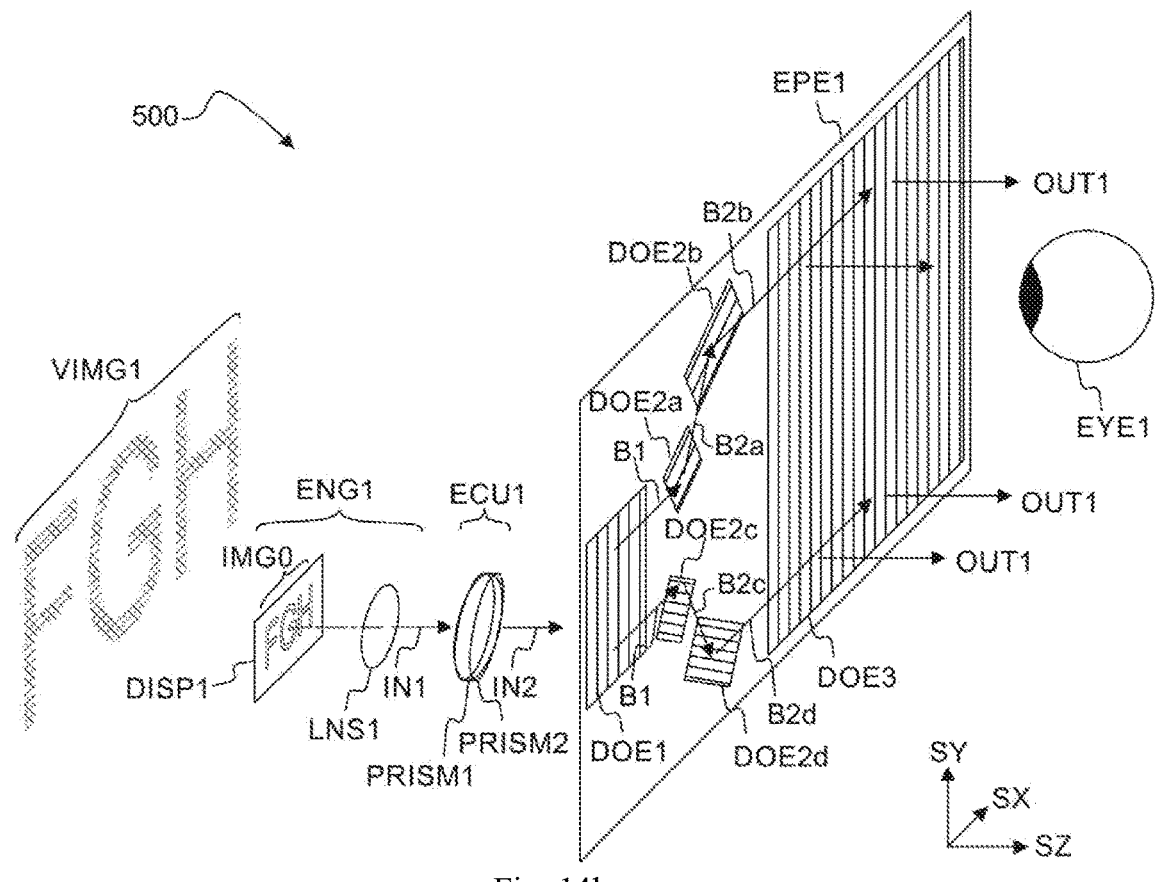

FIG. 14b shows a display apparatus 500, which comprises the optical engine ENG1, the modifier unit ECU1, and the expander device EPE1 of FIG. 14a. The modifying unit ECU1 may be arranged to compensate the dispersion caused by the non-zero sum of the grating vectors, as described above.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. A display apparatus, comprising:
an optical engine, configured to form first input light, which comprises a plurality of input light beams representing an input image;
a modifying unit, configured to form second input light from the first input light; and
a diffractive waveguiding expander device, configured to form output light by diffractively expanding the second input light, wherein the output light comprises a plurality of output light beams representing said input image,
wherein the expander device comprises a diffractive in-coupling element and an out-coupling element contributing to the direction of light in an optical path,
wherein each of the diffractive in-coupling element and the out-coupling element has one or more grating vectors contributing to the direction of light in the optical path,
wherein the diffractive in-coupling element of the optical path has a first grating vector,
wherein a magnitude ratio of the magnitude of a sum of the grating vectors to the magnitude of the absolute value of the first grating vector is in the range of 0.01% to 1%,
wherein a first angular deflection is an angular difference between a direction of a first input light beam having a first color, and a direction of a first output light beam formed from light of the first input light beam, wherein a second angular deflection is an angular difference between a direction of a second input light beam having a second color, and a direction of a second output light beam formed from light of the second input light beam, wherein the modifying unit comprises at least a first prism to reduce the difference between the first angular deflection and the second angular deflection.

2. The display apparatus of claim 1, wherein the first prism comprises a first material to provide first dispersion, wherein the material, orientation, and wedge angle of the prism are selected such that the difference between the first angular deflection and the second angular deflection is smaller than said magnitude ratio multiplied by 1°.

3. The display apparatus of claim 1, wherein the modifying unit comprises the first prism and a second prism positioned one after the other, wherein the first prism comprises a first material to provide first dispersion, and the second prism comprises a second material to provide second different dispersion, wherein the materials, orientations, and wedge angles of the prisms are selected such that a difference between a direction of an output light beam having the first color and a direction of an output light having the second color is smaller than said magnitude ratio multiplied by 1° in a situation where the output light beam having the first color and the output light beam having the second color correspond to the same point of the input image, and wherein a difference between a direction of the output light beam having the first color and a direction of an output light having a third color is smaller than 0.01° in a situation where the output light beam having the first color and the output light beam having the third color correspond to the same point of the input image.

4. The display apparatus of claim 1, wherein the input image is a multi-color image, which comprises a first sub-image having a color and second sub-image having a different color, wherein the optical engine is arranged to form the input image such that the first sub-image is displaced with respect to the second sub-image.

5. The display apparatus of claim 1, wherein the optical engine is arranged to form a multi-color image point of the input image such that the multi-color image point comprises a single-color image point having the first color, a single-color image point having the second color, and a single-color image point having the third color, wherein one of said single color image points is displaced with respect to the other single color image points such that the largest angular difference between directions of output light beams formed from light of said single color image points is smaller than 0.01°.

6. The display apparatus of claim 1, wherein the spectral bandwidth of a broadband output light beam is in the range of 10 nm to 50 nm, wherein the modifying unit is arranged to compensate an effect of the magnitude ratio on the angular divergence of the broadband output light beam.

7. The display apparatus of claim 1, wherein the spectral bandwidth of a broadband input light beam is in the range of 10 nm to 50 nm, wherein the modifying unit is arranged to compensate an effect of the magnitude ratio on a divergence of a broadband output light beam formed from the broadband input light beam such that a difference between the divergence of the broadband output light beam and the divergence of the broadband input light beam is smaller than said magnitude ratio multiplied by 0.5°.

8. The display apparatus of claim 1, wherein the optical axis of the optical engine is tilted with respect to the surface normal of the diffractive in-coupling element.

9. The display apparatus of claim 1, wherein the diffractive waveguiding expander device comprises a waveguide plate, which in turn comprises:
   the diffractive in-coupling element to form first guided light by diffracting the second input light into the waveguide plate,
   an expander element to form second guided light by diffracting the first guided light, and
   the out-coupling element to form output light by diffracting the second guided light out of the waveguide plate.

10. The display apparatus of claim 1, wherein the diffractive waveguiding expander device comprises a waveguide plate, which in turn comprises:
   the diffractive in-coupling element to form first guided light by diffracting the second input light into the waveguide plate,
   a first expander element to form second guided light by diffracting the first guided light,
   a second expander element to form third guided light by diffracting the second guided light) and
   the out-coupling element to form output light by diffracting the third guided light out of the waveguide plate.

11. The display apparatus of claim 1, wherein the diffractive waveguiding expander device comprises a waveguide plate, which in turn comprises:
   the diffractive in-coupling element to form first guided light by diffracting the second input light into the waveguide plate, and
   an out-coupling element to form output light by diffracting the first guided light out of the waveguide plate.

12. The display apparatus of claim 1, wherein the magnitude ratio of the sum of the grating vectors to the magnitude of the first grating vector is in the range of 0.1% to 1%.

* * * * *